(12) United States Patent
Benfey et al.

(10) Patent No.: US 12,144,344 B2
(45) Date of Patent: Nov. 19, 2024

(54) COMPOSITIONS AND METHODS FOR MODULATING ROOT GROWTH

(71) Applicant: DUKE UNIVERSITY, Durham, NC (US)

(72) Inventors: Philip Benfey, Durham, NC (US); Alexandra Dickinson, Durham, NC (US)

(73) Assignee: Duke University, Durham, NC (US)

( * ) Notice: Subject to any disclaimer, the term of this patent is extended or adjusted under 35 U.S.C. 154(b) by 522 days.

(21) Appl. No.: 17/291,992

(22) PCT Filed: Nov. 9, 2019

(86) PCT No.: PCT/US2019/060654
§ 371 (c)(1),
(2) Date: May 6, 2021

(87) PCT Pub. No.: WO2020/097590
PCT Pub. Date: May 14, 2020

(65) Prior Publication Data
US 2022/0000103 A1 Jan. 6, 2022

Related U.S. Application Data

(60) Provisional application No. 62/757,796, filed on Nov. 9, 2018.

(51) Int. Cl.
| | | |
|---|---|---|
| *A01N 33/02* | (2006.01) | |
| *A01N 31/02* | (2006.01) | |
| *A01N 31/04* | (2006.01) | |
| *A01N 37/06* | (2006.01) | |
| *A01N 37/08* | (2006.01) | |
| *A01N 43/12* | (2006.01) | |

(52) U.S. Cl.
CPC ............ *A01N 33/02* (2013.01); *A01N 31/02* (2013.01); *A01N 31/04* (2013.01); *A01N 37/06* (2013.01); *A01N 37/08* (2013.01); *A01N 43/12* (2013.01)

(58) Field of Classification Search
CPC ........ A01N 33/02; A01N 31/02; A01N 31/04; A01N 37/08; A01N 43/12
See application file for complete search history.

(56) References Cited

U.S. PATENT DOCUMENTS

| 6,927,320 B1 | 8/2005 | Benfey et al. |
| 2002/0019996 A1 | 2/2002 | Benfey et al. |
| 2008/0227645 A1 | 9/2008 | Woolard et al. |
| 2008/0276332 A1 | 11/2008 | Beyer et al. |
| 2013/0303372 A1* | 11/2013 | Haas .................... A01N 43/653 504/144 |

FOREIGN PATENT DOCUMENTS

| WO | 00/49865 | * | 8/2000 | |
| WO | WO 2009/049747 A1 | | 4/2009 | |
| WO | 2010/136466 A2 | * | 12/2010 | |
| WO | 2017001927 A1 | | 1/2017 | |
| WO | WO-2017201410 A1 | * | 11/2017 | ............. A01N 35/02 |

OTHER PUBLICATIONS

International Search Report and Written Opinion mailed Jan. 29, 2020 for International Patent Application No. PCT/US2019/060654 (Benfey et al. // Duke University) (11 pages).
Noy N. (2000) Retinoid-binding proteins: mediators of retinoid action. Biochem. J. 348(Pt 3):481-495.
Akiyama K, et al. (2005) Plant sesquiterpenes induce hyphal branching in arbuscular mycorrhizal fungi. Nature. 435 (7043):824-827.
Besserer A, et al. (2006) Strigolactones stimulate arbuscular mycorrhizal fungi by activating mitochondria. PLoS Biol. 4 (7):e226.
Brady SM, et al. (2007) A high-resolution root spatiotemporal map reveals dominant expression patterns. Science. 318 (5851):801-806.
Comas LH, et al. (2013) Root traits contributing to plant productivity under drought. Front Plant Sci. 4:442.
De Smet I, et al. (2008) Receptor-like kinase ACR4 restricts formative cell divisions in the *Arabidopsis* root. Science. 322(5901):594-597.
Dickinson AJ, et al. (2019) β-Cyclocitral is a conserved root growth regulator. Proceedings of the National Academy of Sciences of the United States of America. 116(21):10563-10567.
Eroglu A, et al. (2012) Naturally occurring eccentric cleavage products of provitamin A β-carotene function as antagonists of retinoic acid receptors. J Biol Chem. 287(19):15886-15895.
Fleshman MK, et al. (2011) Carotene and novel apocarotenoid concentrations in orange-fleshed Cucumis melo melons: determinations of β-carotene bioaccessibility and bioavailability. J Agric Food Chem. 59(9):4448-4454.
Giuffrida D, et al. (2017) Apocarotenoids determination in Capsicum chinense Jacq. cv. Habanero, by supercritical fluid chromatography-triple-quadrupole/mass spectrometry. Food Chem. 231:316-323.
Harrison MJ, et al. (2005) Signaling in the arbuscular mycorrhizal symbiosis. Ann. Rev. Microbiol., 59:19-42.
Li S, et al. (2016) High-Resolution Expression Map of the *Arabidopsis* Root Reveals Alternative Splicing and lincRNA Regulation. Developmental Cell. 39(4):508-522.
Manschadi AM, et al. (2006) The role of root architectural traits in adaptation of wheat to water-limited environments. Functional Plant Biology, 33:823-837.
Rogers ED, et al. (2015) Regulation of plant root system architecture: implications for crop advancement. Curr Opin Biotechnol. 32:93-98.
Tejos R, et al. (2018) Patellins are regulators of auxin-mediated PIN1 relocation and plant development in *Arabidopsis thaliana*. J Cell Sci. 131(2):jcs204198.

(Continued)

*Primary Examiner* — Alma Pipic
(74) *Attorney, Agent, or Firm* — POLSINELLI PC

(57) ABSTRACT

This disclosure relates to methods of regulating growth in a plant. Specifically, the methods of the disclosure regulate growth of the plant by administration of a composition comprising an effective amount of one or more apocarotenoids to the plant, its part, or the seed.

12 Claims, 14 Drawing Sheets

(56) References Cited

OTHER PUBLICATIONS

Uga Y, et al. (2013) Control of root system architecture by Deeper Rooting 1 increases rice yield under drought conditions. Nat Genet. 45(9):1097-1102.
Van Norman JM, et al. (2014) Periodic root branching in *Arabidopsis* requires synthesis of an uncharacterized carotenoid derivative. Proceedings of the National Academy of Sciences of the United States of America, 111(13):E1300-E1309.
Yapici I, et al. (2015) "Turn-on" protein fluorescence: in situ formation of cyanine dyes. J Am Chem Soc. 137 (3):1073-1080.

\* cited by examiner

COMPOSITIONS AND METHODS FOR MODULATING ROOT GROWTH

CROSS-REFERENCE TO RELATED APPLICATIONS

This application is U.S. national phase application under 35 U.S.C. § 371 of International Application No. PCT/US2019/060654, filed on Nov. 9, 2019, which claims the benefit of U.S. Provisional Patent Application No. 62/757,796, filed on Nov. 9, 2018, which are incorporated herein by reference in their entirety.

STATEMENT REGARDING FEDERALLY SPONSORED RESEARCH OR DEVELOPMENT

This invention was made with United States government support awarded by NIH Grant No. MIRA 1R35GM131725. The United States government has certain rights in this invention.

BACKGROUND

Field

This disclosure relates to methods for regulating growth in a plant. Specifically, the methods of the disclosure regulate the growth of the plant by administration of a composition comprising an effective amount of one or more apocarotenoids to the plant, its part, or the seed.

Description of the Related Art

Apocarotenoids, secondary metabolites derived from carotenoids such as beta-carotene, are cross-kingdom regulators of development. For instance, strigolactone and absisic acid are apocarotenoids important for plant root and shoot structure. One particularly important class of apocarotenoids in vertebrate development consists of retinoids, specifically retinal, retinol, and retinoic acid. Proper levels of beta-carotene-derived retinoids are critical during human embryogenesis. Retinoid deficiency causes morphological defects and blindness. Excess retinoids can lead to physical and cognitive birth defects. Retinoid binding proteins (RBPs) have diverse roles in many developmental processes, including somitogenesis, neurogenesis, and vasculature development. RBPs have also been characterized extensively for their role in light sensing. Rhodopsin, a light-sensitive complex composed of an opsin protein bound to retinal, is crucial for photoreception in a range of animal, bacteria, and algae species. However, the function of retinoids in multi-cellular development outside of the animal kingdom has remained uncharacterized.

BRIEF SUMMARY OF THE DISCLOSURE

Natural signaling molecules capable of increasing root depth and branching are highly desirable tools for enhancing stress tolerance in crops. The inventors have found novel modulators of root architecture in plants when applied exogenously to the plants.

The present disclosure is based, in part, on the finding by the inventors that certain beta-carotene-derived metabolites (e.g., apocarotenoids) can act as plant growth regulators by modifying root architecture, in particular the depth and density of a root system, when applied exogenously to a plant, and methods of making and using said compounds.

Thus, one aspect of the disclosure provides methods for regulating growth in a plant, the method comprising exogenously contacting a composition comprising an effective amount of one or more apocarotenoids to the plant, a plant part, or a plant seed.

Another aspect of the disclosure provides methods for improving drought tolerance in a plant, the method comprising exogenously contacting a composition comprising an effective amount of one or more apocarotenoids to the plant, a plant part, or a plant seed.

Another aspect of the disclosure provides methods for fertilizing soil, the method comprising providing a composition comprising an effective amount of one or more apocarotenoids to the soil.

Another aspect of the disclosure provides a method for controlling a harmful plant in a crop, the method comprising exogenously contacting a composition comprising a herbicidally active amount of one or more apocarotenoids to the harmful plant, a harmful plant part, a harmful plant seed and/or an area in which the harmful plant grows.

Another aspect of the disclosure provides a method for identifying a plant protein associated with a root development phenotype, the method comprising identifying a plant protein that has significant homology to a vertebrate retinoid binding protein, and determining whether one or more mutations in a gene encoding the plant protein results in a root development phenotype as compared to a wild type plant.

Yet another aspect of the disclosure provides compositions comprising, consisting of, or consisting essentially of an effective amount of one or more apocarotenoids present in the composition in a concentration of about 0.01 µM to about 100 mM and an agriculturally acceptable carrier, excipient, and/or diluent.

BRIEF DESCRIPTION OF THE DRAWINGS

The accompanying drawings are included to provide a further understanding of the methods and compositions of the disclosure, and are incorporated in and constitute a part of this specification. The drawings illustrate one or more embodiment(s) of the disclosure, and together with the description serve to explain the principles and operation of the disclosure.

FIG. 1A is a schematic showing how plant roots can be divided into spatially distinct regions: the meristem zone composed of pluripotent mitotic cells, the cell elongation zone, and the differentiation zone. FIG. 1B is a schematic showing that merocyanine aldehyde is a reporter that only becomes fluorescent when bound to the active site of an RA binding protein. FIG. 1C are fluorescent images showing that *Arabidopsis* roots treated with the merocyanine aldehyde reporter exhibit dynamic fluorescence in the meristem (M), elongation (E), and differentiation (D) zones.

FIG. 1D is a graph showing cells at the center of the bright merocyanine aldehyde pulses in the elongation and differentiation zones are significantly more likely to be close to the sites of lateral root primordia (LRP) than control cells. FIG. 1E is a graph showing that D15, a known inhibitor of lateral root organogenesis, reduces the number of dynamic fluorescent pulses of merocyanine.

FIG. 2A shows structures of hydrophobic carotenals (Apo10, Apo12, Apo14, and Retinal) and comparatively hydrophilic carotenals (Beta-ionone and Beta-cyclocitral). FIG. 2B is a graph showing changes in whole plant levels of apocarotenoids upon D15 treatment.

FIG. 4A is a graph showing the effects of 10 µM of select apocarotenoids (psuedoinonone (PI), dihydroactinidiolide (DHAD), abscisic acid (ABA), Apo10, Apo12, Apo14, and retinal) on the oscillation amplitude of the lateral root clock. FIG. 4B are graphs showing the effects of co-treatment with 500 nM Apo14 and D15 on primary root growth (left) and Apo14 rescue of lateral root capacity in D15 treated plants, normalized to the control treatment (right). FIG. 4C are graphs showing the effects of co-treatment with 1 µM retinal and 125 µM D15 on primary root growth (left) and lateral root branching (right). FIG. 4D is a graph showing the effects of exogenous retinal on lateral root primordia.

DETAILED DESCRIPTION OF THE DISCLOSURE

Figure 1A:
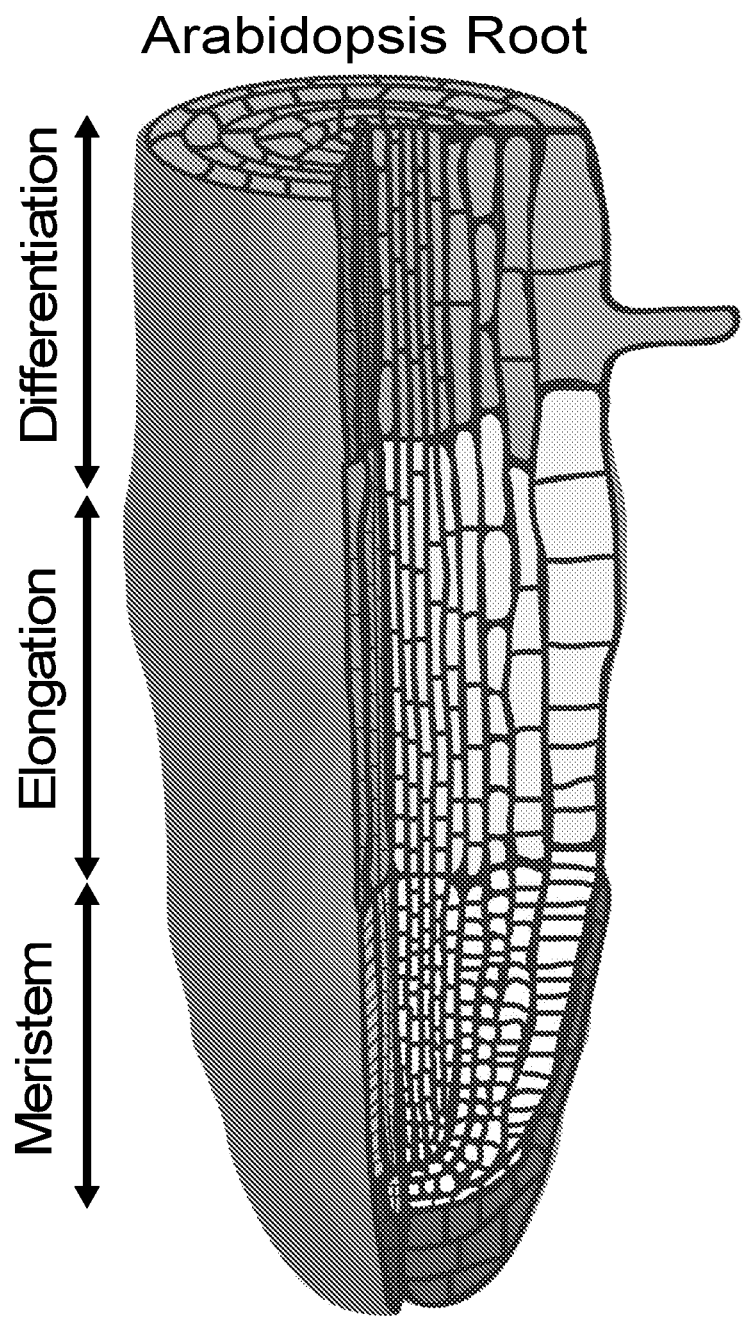
FIG. 1A-1E illustrates a reporter for RA binding proteins highlighting distinct developmental regions in the *Arabidopsis* root.

Before the disclosed methods and compositions are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. The term "about" in association with a numerical value means that the numerical value can vary plus or minus by 5% or less of the numerical value.

As used herein, the term "contacting" includes the physical contact of at least one substance to another substance.

Definitions

The following terms and expressions used herein have the indicated meanings.

Terms used herein may be preceded and/or followed by a single dash, or a double dash, "=", to indicate the bond order of the bond between the named substituent and its parent moiety; a single dash indicates a single bond and a double dash indicates a double bond. In the absence of a single or double dash it is understood that a single bond is formed between the substituent and its parent moiety; further, substituents are intended to be read "left to right" unless a dash indicates otherwise. For example, $C_1$-$C_6$alkoxycarbonyloxy and —OC^$C_1$-$C_6$ alkyl indicate the same functionality; similarly arylalkyl and -alkylaryl indicate the same functionality.

The term "alkenyl" as used herein, means a straight or branched chain hydrocarbon containing from 2 to 10 carbons, unless otherwise specified, and containing at least one carbon-carbon double bond. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, 3-decenyl, and 3,7-dimethylocta-2,6-dienyl.

The term "alkoxy" as used herein, means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "alkyl" as used herein, means a straight or branched chain hydrocarbon containing from 1 to 10 carbon atoms unless otherwise specified. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl. When an "alkyl" group is a linking group between two other moieties, then it may also be a straight or branched chain; examples include, but are not limited to —$CH_2$—, —$CH_2CH_2$-, —$CH_2CH_2CHC(CH_3)$—, —$CH_2CH(CH_2CH_3)CH_2$-.

The term "alkylene" refers to a bivalent alkyl group. An "alkylene chain" is a polymethylene group, i.e., —$(CH_2)n$-, wherein n is a positive integer, preferably from one to six, from one to four, from one to three, from one to two, or from two to three. A substituted alkylene chain is a polymethylene group in which one or more methylene hydrogen atoms is replaced with a substituent. Suitable substituents include those described below for a substituted aliphatic group. An alkylene chain also may be substituted at one or more positions with an aliphatic group or a substituted aliphatic group.

The term "alkynyl" as used herein, means a straight or branched chain hydrocarbon group containing from 2 to 10 carbon atoms and containing at least one carbon-carbon triple bond. Representative examples of alkynyl include, but are not limited, to acetylenyl, 1-propynyl, 2-propynyl, 3-butynyl, 2-pentynyl, and 1-butynyl.

The term "aryl," as used herein, means a phenyl (i.e., monocyclic aryl), or a bicyclic ring system containing at least one phenyl ring or an aromatic bicyclic ring containing only carbon atoms in the aromatic bicyclic ring system. The bicyclic aryl can be azulenyl, naphthyl, or a phenyl fused to a monocyclic cycloalkyl, a monocyclic cycloalkenyl, or a monocyclic heterocyclyl. The bicyclic aryl is attached to the parent molecular moiety through any carbon atom contained within the phenyl portion of the bicyclic system, or any carbon atom with the napthyl or azulenyl ring. The fused monocyclic cycloalkyl or monocyclic heterocyclyl portions of the bicyclic aryl are optionally substituted with one or two oxo and/or thia groups. Representative examples of the bicyclic aryls include, but are not limited to, azulenyl, naphthyl, dihydroinden-1-yl, di ydroinden-2-yl, dihydroinden-3-yl, dihydroinden-4-yl, 2,3-dihydroindol-4-yl, 2,3-dihydroindol-5-yl, 2,3-di ydroindol-6-yl, 2,3-dihydroindol-7-yl, inden-1-yl, inden-2-yl, inden-3-yl, inden-4-yl, dihydronaphthalen-2-yl, dihydronaphthalen-3-yl, dihydronaphthalen-4-yl, dihydronaphthalen-1-yl, 5,6,7,8-tetrahydronaphthalen-1-yl, 5,6,7,8-tetrahydronaphthalen-2-yl, 2,3-dihydrobenzofuran-4-yl, 2,3-dihydrobenzofuran-5-yl, 2,3-dihydrobenzofuran-6-yl, 2,3-dihydrobenzofuran-7-yl, benzo[d][1,3]dioxol-4-yl, benzo[d][1,3]dioxol-5-yl, 2H-chromen-2-on-5-yl, 2H-chromen-2-on-6-yl, 2H-chromen-2-on-7-yl, 2H-chromen-2-on-8-yl, isoindoline-1,3-dion-4-yl, isoindoline-1,3-dion-5-yl, inden-1-on-4-yl, inden-1-on-5-yl, inden-1-on-6-yl, inden-1-on-7-yl, 2,3-dihydrobenzo[b][1,4]dioxan-5-yl, 2,3-dihydrobenzo[b][1,4]dioxan-6-yl, 2H-benzo[b][1,4]oxazin3(4H)-on-5-yl, 2H-benzo[b][1,4]oxazin3(4H)-on-6-yl, 2H-benzo[b][1,4]oxazin3(4H)-on-7-yl, 2H-benzo[b][1,4]oxazin3(4H)-on-8-yl, benzo[d]oxazin-2(3H)-on-5-yl, benzo[d]oxazin-2(3H)-on-6-yl, benzo[d]oxazin-2(3H)-on-7-yl, benzo[d]oxazin-2(3H)-on-8-yl, quinazolin-4(3H)-on-5-yl, quinazolin-4(3H)-on-6-yl, quinazolin-4(3H)-on-7-yl, quinazolin-4(3H)-on-8-yl, quinoxalin-2(1H)-on-5-yl, quinoxalin-2(1H)-on-6-yl, quinoxalin-2(1H)-on-7-yl, quinoxalin-2(1H)-on-8-yl, benzo[d]thiazol-2(3H)-on-4-yl, benzo[d]thiazol-2(3H)-on-5-yl, benzo[d]thiazol-2(3H)-on-6-yl, and, benzo[d]thiazol-2(3H)-on-7-yl. In certain embodiments, the bicyclic aryl is (i) naphthyl or (ii) a phenyl ring fused to either a 5 or 6 membered monocyclic cycloalkyl, a 5 or 6 membered monocyclic cycloalkenyl, or a 5 or 6 membered monocyclic heterocyclyl, wherein the fused cycloalkyl, cycloalkenyl, and heterocyclyl groups are optionally substituted with one or two groups which are independently oxo or thia.

An "aralkyl" or "arylalkyl" group comprises an aryl group covalently attached to an alkyl group, either of which independently is optionally substituted. Preferably, the aralkyl group is aryl(C1-C6)alkyl, including, without limitation, benzyl, phenethyl, and naphthylmethyl.

The terms "cyano" and "nitrile" as used herein, mean a —CN group.

The term "cycloalkyl" as used herein, means a monocyclic or a bicyclic cycloalkyl ring system. Monocyclic ring systems are cyclic hydrocarbon groups containing from 3 to 8 carbon atoms, where such groups can be saturated or unsaturated, but not aromatic. In certain embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Bicyclic cycloalkyl ring systems are bridged monocyclic rings or fused bicyclic rings. Bridged monocyclic rings contain a monocyclic cycloalkyl ring where two non-adjacent carbon atoms of the monocyclic ring are linked by an alkylene bridge of between one and three additional carbon atoms (i.e., a bridging group of the form —(CH$_2$)W—, where w is 1, 2, or 3). Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane.

Fused bicyclic cycloalkyl ring systems contain a monocyclic cycloalkyl ring fused to either a phenyl, a monocyclic cycloalkyl, a monocyclic cycloalkenyl, a monocyclic heterocyclyl, or a monocyclic heteroaryl. The bridged or fused bicyclic cycloalkyl is attached to the parent molecular moiety through any carbon atom contained within the monocyclic cycloalkyl ring. Cycloalkyl groups are optionally substituted with one or two groups which are independently oxo or thia. In certain embodiments, the fused bicyclic cycloalkyl is a 5 or 6 membered monocyclic cycloalkyl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused bicyclic cycloalkyl is optionally substituted by one or two groups which are independently oxo or thia.

The term "halo" or "halogen" as used herein, means —Cl, —Br, —I or —F.

The terms "haloaliphatic," "haloalkyl," "haloalkenyl," and "haloalkoxy" refer to an aliphatic, alkyl, alkenyl or alkoxy group, as the case may be, which is substituted with one or more halogen atoms.

The term "heteroaryl," as used herein, means a monocyclic heteroaryl or a bicyclic ring system containing at least one heteroaromatic ring. The monocyclic heteroaryl can be a 5 or 6 membered ring. The 5 membered ring consists of two double bonds and one, two, three or four nitrogen atoms and optionally one oxygen or sulfur atom. The 6 membered ring consists of three double bonds and one, two, three or four nitrogen atoms. The 5 or 6 membered heteroaryl is connected to the parent molecular moiety through any carbon atom or any nitrogen atom contained within the heteroaryl. Representative examples of monocyclic heteroaryl include, but are not limited to, furyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, and triazinyl. The bicyclic heteroaryl consists of a monocyclic heteroaryl fused to a phenyl, a monocyclic cycloalkyl, a monocyclic cycloalkenyl, a monocyclic heterocyclyl, or a monocyclic heteroaryl. The fused cycloalkyl or heterocyclyl portion of the bicyclic heteroaryl group is optionally substituted with one or two groups which are independently oxo or thia. When the bicyclic heteroaryl contains a fused cycloalkyl, cycloalkenyl, or heterocyclyl ring, then the bicyclic heteroaryl group is connected to the parent molecular moiety through any carbon or nitrogen atom contained within the monocyclic heteroaryl portion of the bicyclic ring system. When the bicyclic heteroaryl is a monocyclic heteroaryl fused to a benzo ring, then the bicyclic heteroaryl group is connected to the parent molecular moiety through any carbon atom or nitrogen atom within the bicyclic ring system. Representative examples of bicyclic heteroaryl include, but are not limited to, benzimidazolyl, benzofuranyl, benzothienyl, benzoxadiazolyl, benzoxathiadiazolyl, benzothiazolyl, cinnolinyl, 5,6-dihydroquinolin-2-yl, 5,6-dihydroisoquinolin-1-yl, furopyridinyl, indazolyl, indolyl, isoquinolinyl, naphthyridinyl, quinolinyl, purinyl, 5,6,7,8-tetrahydroquinolin-2-yl, 5,6,7,8-tetrahydroquinolin-3-yl, 5,6,7,8-tetrahydroquinolin-4-yl, 5,6,7,8-tetrahydroisoquinolin-1-yl, thienopyridinyl, 4,5,6,7-tetrahydrobenzo[c][1,2,5]oxadiazolyl, and 6,7-dihydrobenzo[c][1,2,5]oxadiazol-4(5H)-onyl.

The terms "heterocyclyl" and "heterocycloalkyl" as used herein, mean a monocyclic heterocycle or a bicyclic heterocycle. The monocyclic heterocycle is a 3, 4, 5, 6 or 7 membered ring containing at least one heteroatom independently selected from the group consisting of O, N, and S where the ring is saturated or unsaturated, but not aromatic. The 3 or 4 membered ring contains 1 heteroatom selected from the group consisting of O, N and S. The 5 membered ring can contain zero or one double bond and one, two or three heteroatoms selected from the group consisting of O, N and S. The 6 or 7 membered ring contains zero, one or two double bonds and one, two or three heteroatoms selected from the group consisting of O, N and S. The monocyclic heterocycle is connected to the parent molecular moiety through any carbon atom or any nitrogen atom contained within the monocyclic heterocycle. Representative examples of monocyclic heterocycle include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to either a phenyl, a monocyclic cycloalkyl, a monocyclic cycloalkenyl, a monocyclic heterocycle, or a monocyclic heteroaryl. The bicyclic heterocycle is connected to the parent molecular moiety through any carbon atom or any nitrogen atom contained within the monocyclic heterocycle portion of the bicyclic ring system. Representative examples of bicyclic heterocyclyls include, but are not limited to, 2,3-dihydrobenzofuran-2-yl, 2,3-dihydrobenzofuran-3-yl, indolin-1-yl, indolin-2-yl, indolin-3-yl, 2,3-dihydrobenzothien-2-yl, decahydroquinolinyl, decahydroisoquinolinyl, octahydro-1H-indolyl, and octahydrobenzofuranyl. Heterocyclyl groups are optionally substituted with one or two groups which are independently oxo or thia. In certain embodiments, the bicyclic heterocyclyl is a 5 or 6 membered monocyclic heterocyclyl ring fused to phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the bicyclic heterocyclyl is optionally substituted by one or two groups which are independently oxo or thia.

The term "nitro" as used herein, means a —$NO_2$ group.

The term "oxo" as used herein means a =O group.

The term "saturated" as used herein means the referenced chemical structure does not contain any multiple carbon-carbon bonds. For example, a saturated cycloalkyl group as defined herein includes cyclohexyl, cyclopropyl, and the like.

The term "substituted," as used herein, means that a hydrogen radical of the designated moiety is replaced with the radical of a specified substituent, provided that the substitution results in a stable or chemically feasible compound. The term "substitutable," when used in reference to a designated atom, means that attached to the atom is a hydrogen radical, which can be replaced with the radical of a suitable substituent.

The phrase "one or more" substituents, as used herein, refers to a number of substituents that equals from one to the maximum number of substituents possible based on the number of available bonding sites, provided that the above conditions of stability and chemical feasibility are met. Unless otherwise indicated, an optionally substituted group may have a substituent at each substitutable position of the group, and the substituents may be either the same or different. As used herein, the term "independently selected" means that the same or different values may be selected for multiple instances of a given variable in a single compound.

The term "thia" as used herein means a =S group.

The term "unsaturated" as used herein means the referenced chemical structure contains at least one multiple carbon-carbon bond, but is not aromatic. For example, an unsaturated cycloalkyl group as defined herein includes cyclohexenyl, cyclopentenyl, cyclohexadienyl, and the like.

Compositions

The present disclosure provides compositions comprising compounds (e.g., apocarotenoids) that act as plant growth regulators. These compounds can modify root architecture, which plays a critical role in a plant's ability to respond to diverse environmental stresses, such as drought.

As used herein, the term "effective amount" refers to that amount of the composition which, when administered to a plant, is sufficient to elicit a desired effect (e.g., modified root architecture). The amount of a composition that constitutes an "effective amount" will vary depending on the composition, the plant, and desired outcome, but can be determined routinely by one of ordinary skill in the art. In some embodiments, an "effective amount" comprises a low concentration (e.g., in the nM or µM concentration range) of the composition.

One of skill in the art will recognize that the amounts of the composition (and any additional compounds) which are optimal in each case depend on the nature of the apocarotenoid used and any additional compounds used and on the nature and development stage of the plant stock to be treated, and can be determined in each individual case by simple, routine preliminary tests. In one embodiment, the effective amount of one or more apocarotenoids is at least about 100 nM per $m^3$ of soil, or at least about 10 mg per $m^3$ of soil.

As used herein, the term "herbicidally active amount" in the context of the present disclosure means an amount of the composition that is suitable for adversely affecting plant growth (e.g., reducing drought tolerance, killing the plant, etc.). In some embodiments, a "herbicidally active amount" comprises a high concentration (e.g., 100 µM or above or from about 100 µM to about 100 mM) of the agricultural compound.

As used herein, the term "root architecture" means the spatial arrangement of a plant's root tissue within the soil.

As used herein, the term "improving growth" refers to promoting, increasing or improving the rate of growth of the plant or increasing or promoting an increase in the size of the plant.

As used herein, the term "reducing growth" refers to decreasing or slowing the rate of growth of the plant or decreasing or promoting a decrease in the size of the plant.

All percentages, ratios and proportions herein are by weight, unless otherwise specified. A weight percent (weight %, also as wt %) of a component, unless specifically stated to the contrary, is based on the total weight of the formulation or composition in which the component is included (e.g., on the total amount of an apocarotenoid).

In view of the present disclosure, the methods and compositions described herein can be configured by the person of ordinary skill in the art to meet the desired need. In general, the disclosed materials, methods, and apparati provide apocarotenoids that can modify root architecture when applied exogenously to plants. Root architecture plays a major role in plant fitness, crop performance, and/or grain yield. The inventors have found novel regulators of root architecture in plants when applied exogenously to the plants. For example, low concentrations (e.g., in the nM or µM concentration range) of apocarotenoids of the disclosure (e.g., Apo14, retinal) were found to fully rescue root growth and lateral root organogenesis in the presence of an apocarotenoid synthesis inhibitor. Lateral roots constitute the majority of a mature plant's root system and are vital for plant anchorage, absorption of water and nutrients, and survival in the presence of diverse environmental stresses such as drought.

The methods of the disclosure require a composition comprising, consisting of, or consisting essentially of one or more apocarotenoids.

As used herein, the term "apocarotenoid" means a cleavage product derived from one or more carotenoids. Included within the term "apocarotenoid" are "apocarotenals," which include those carotenoids that contain an aldehyde functional group. Most apocarotenoids are normally present at very low levels in the roots of plants. Apocarotenoids are formed by the action of nine different carotenoid cleavage dioxygenases (CCDs). The specific products generated by each individual CCD are difficult to characterize because CCDs seem to have functional redundancy. For instance, although it is known that D15 (N-(4-fluorobenzyl)-methoxycinnamic hydroxamic acid) can inhibit CCD8, ccd8 mutants do not have reduced lateral root capacity. This makes it very difficult to specifically reduce the levels of a particular apocarotenoid, such as β-cyclocitral, using genetic approaches. In addition, overexpression or mutagenesis of one or more CCDs that normally produce a particular apocarotenoid would likely affect other, less desired, apocarotenoids. This makes it extremely challenging to change endogenous levels of a particular apocarotenoid in plants using genetic approaches. The inventors have found that exogenous application of a composition comprising one or more apocarotenoids can profoundly alter root architecture.

Examples of apocarotenoids include, but are not limited to, abscisic acid, apocarotenal, bixin, β-ionone, β-cyclocitral, crocetin, safranal, dihydro-β-Ionone, dimethyl-β-cyclocitral, dihydroactinidiolide (DHAD), ethyl ester of beta-apo-8'-carotenic acid, α-ionone, pseudoionone, peridinin, apo-10-carotenal (Apo10), apo-12-carotenal (Apo12), apo-14-carotenal (Apo14), apo-14-carotenoic acid, apo-14-carotenol, apo-16-carotenal (Retinal), retinol, retinoic acid (RA), dehydroretinal, tretinoin, isotretinoin, alitretinoin, etretinate, acitretin, adapalene, bexarotene, tazaotene, and/or any derivatives (including functional derivatives) and/or analogues and/or combinations thereof.

In one embodiment, the apocarotenoid of the disclosure is selected from the group consisting of β-ionone, β-cyclocitral, safranal, dihydro-β-Ionone, dimethyl-β-cyclocitral, dihydroactinidiolide (DHAD), α-ionone, pseudoionone, apo-10-carotenal, apo-12-carotenal, apo-14-carotenal, apo-16-carotenal (aka Retinal) and/or any derivatives (including functional derivatives) and/or analogues and/or combinations thereof. The chemical structures of these compounds are provided below:

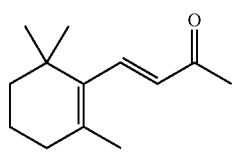

β-ionone

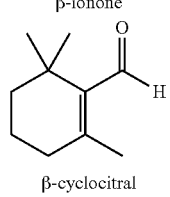

β-cyclocitral

-continued

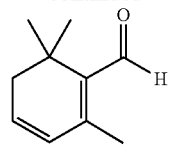

safranal

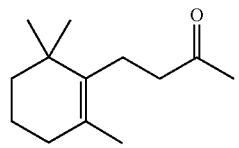

dihydro-β-ionone

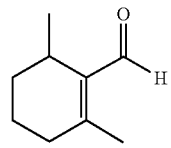

dimethyl-β-cyclocitral

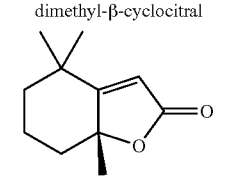

dihydroactinidiolide (DHAD)

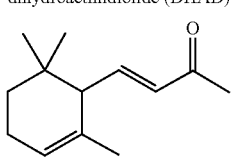

α-ionone

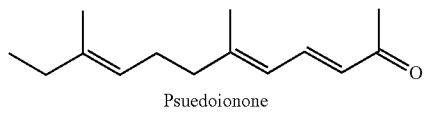

Psuedoionone

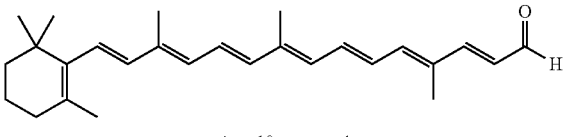

Apo-10-carotenal

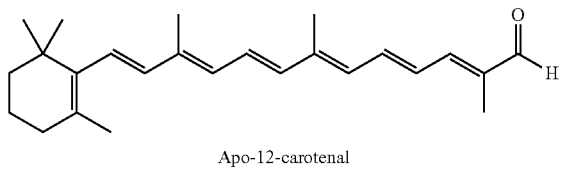

Apo-12-carotenal

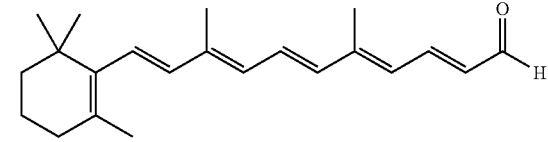

Apo-14-carotenal

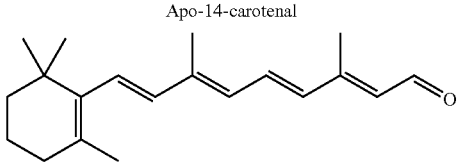

Apo-16-carotenal (Retinal)

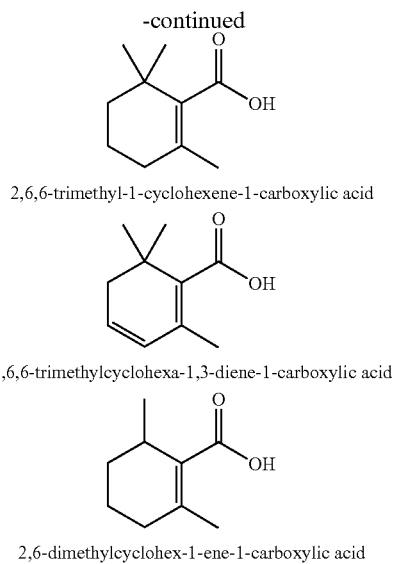

2,6,6-trimethyl-1-cyclohexene-1-carboxylic acid 2,6,6-trimethylcyclohexa-1,3-diene-1-carboxylic acid 2,6-dimethylcyclohex-1-ene-1-carboxylic acid In one embodiment, the apocarotenoid of the disclosure is selected from the group consisting of β-ionone, β-cyclocitral, safranal, dihydro-β-Ionone, dimethyl-β-cyclocitral, dihydroactinidiolide (DHAD), α-ionone, pseudoionone, apo-10-carotenal, apo-12-carotenal, apo-14-carotenal, apo-16-carotenal (Retinal), and combinations thereof.

In one embodiment, the apocarotenoid is an apocarotenal. In one embodiment, the apocarotenoid is a hydrophobic carotenal (e.g., Apo10, Apo12, Apo14, and Retinal) or a hydrophilic carotenal (e.g., Beta-ionone and Beta-cyclocitral).

In one embodiment, the apocarotenoid of the disclosure is selected from the group consisting apo-10-carotenal, apo-12-carotenal, apo-14-carotenal, apo-16-carotenal (aka Retinal), or a combination thereof.

In one embodiment, the apocarotenoid of the disclosure is apo-14-carotenal or retinal. Apo-14-carotenal and retinal are particularly useful in methods to improve growth of the plant. In other embodiments, the apocarotenoid of the disclosure is apo-14-carotenal. In other embodiments, the apocarotenoid of the disclosure is retinal.

A functional derivative of the present disclosure can be a compound that is derived from an apocarotenoid and has a similar activity to the apocarentoid. Examples of functional derivatives of an apocaretnoid include, but are not limited to, oxidized (retinoic acid) and reduced (retinol) forms of retinal and apo-14-carotenal.

In certain embodiments, the apocarotenoid of the disclosure is present in the composition in a concentration of about 0.01 μM to about 100 mM. For example, in certain embodiments, the apocarotenoid of the disclosure is present in the composition in a concentration of about 0.01 μM to about 50 mM, or about 0.01 μM to about 10 mM, or about 0.01 μM to about 5 mM, or about 0.01 μM to about 2 mM, or about 0.01 μM to about 1 mM, or about 0.01 μM to about 500 μM, or about 0.1 μM to about 100 mM, or about 0.1 μM to about 50 mM, or about 0.1 μM to about 50 mM, or about 0.1 μM to about 10 mM, or about 0.1 μM to about 5 mM, or about 0.1 μM to about 2 mM, or about 0.1 μM to about 1 mM, or about 0.1 μM to about 500 μM, or about 1 μM to about 100 mM, or about 1 μM to about 50 mM, or about 1 μM to about 50 mM, or about 1 μM to about 10 mM, or about 1 μM to about 5 mM, or about 1 μM to about 2 mM, or about 1 μM to about 1 mM, or about 1 μM to about 500 μM. Moreover, the apocarotenoid of the disclosure can be present in the composition in a concentration of any of the minimums and maximums provided above.

In certain embodiments, the apocarotenoid of the disclosure is present in the composition in a concentration of about 0.01 μM to about 1 mM, or about 0.01 μM to about 500 μM, or about 0.1 μM to about 100 μM, or about 0.05 μM to 0.15 μM, or about 50 μM to about 150 μM, or about 5 μM to about 15 μM. In certain embodiments, such concentrations are useful for improving plant growth. In certain embodiments, the concentration of about 0.05 μM to 0.15 μM is useful in improving the growth of Arabidopsis. In certain embodiments, the concentration of about 0.01 μM to 100 mM is useful in improving the growth of maize, cucumber, sunflower, rice, and carrot roots.

In certain embodiments, the apocarotenoid of the disclosure is present in the composition in a concentration of more than about 1 mM, or more than about 10 mM, or more than about 20 mM, or about 1 mM to about 10 mM, or about 1 mM to about 20 mM, or about 1 mM to about 50 mM, or about 5 mM to about 10 mM, or about 5 mM to about 15 mM, or about 5 mM to about 20 mM, or about 10 mM to about 100 mM, or about 10 mM to about 20 mM. In certain embodiments, such concentrations are useful for reducing plant growth.

The compositions of the disclosure can further comprise one or more substances formulated for at least one agricultural application. For example, the compositions of the disclosure further comprise one or more of agriculturally acceptable carrier, excipient, and/or diluent. Examples include, but are not limited to fertilizers (e.g., calcium, nitrogen, potassium, phosphorous), micronutrients (e.g., metal ions), insecticides, fungicides, nematocides, bactericides, acaricides, herbicides, plant nutrients, rooting stimulants, chemosterilants, semiochemicals, repellents, attractants, pheromones, feeding stimulants, microbial inocula or entomopathogenic bacteria, viruses, fungi, and other signal compounds including apocarotenoids, flavonoids, jasmonates and strigolactones (Akiyama et al., Nature, 2005, 435:824-827; Harrison, Ann. Rev. Microbiol., 2005, 59:19-42; Besserer et al., PLoS Biol., 2006, 4(7):e226; International Patent Publication No. WO 2009/049747). These compounds can also be formulated into mixtures or multicomponent formulations. Agricultural applications are understood to include, but not be limited to, yield improvement, pest control, disease control, weed control, and resistance to abiotic environmental stress.

Methods of Making

The agricultural compositions described herein can be produced by known processes, for example, as a formulation of one or more of the compounds described herein. In some embodiments, the compounds may be optionally mixed with further active ingredients, additives and/or customary formulation auxiliaries, which are then applied in a customary manner, such as, diluted with water, or as what are called tank-mixes by co-dilution of the separately formulated or partially separately formulated component(s) with water. In other embodiments, the compositions are formed in a dry mixture that is added to the soil in, on and/or around the plant. Such formulations may dissolve when exposed to water and thereby be taken up by the leaves and/or roots of the plant. Likewise possible is the application at different times (split application) of the separately formulated or partially separately formulated one or more compounds (e.g., the application of an apocartenoid followed by an additional component, e.g., herbicide, fungicides, etc.). It is also possible, for example, to apply the one or more compounds in several portions (sequential application), for example pre-emergence applications followed by post-emergence applications, or early post-emergence applications followed by post-emergence applications at an intermediate or late stage.

Applications

The growth regulators described herein have been found to be able to modify root architecture when applied exogenously to a plant, such as *Arabidopsis thaliana*. Some such modifications relate to the lateral roots of a plant, which constitute the majority of a mature plant's root system and are vital for plant anchorage, absorption of water and nutrients, and survival in the presence of diverse environmental stresses such as drought.

Thus, one aspect of the disclosure provides methods for regulating growth in a plant, the method comprising exogenously contacting a composition comprising an effective amount of one or more apocarotenoids to the plant, a plant part, or a plant seed.

In one embodiment, the plants may be regulated to improve growth of the plant. For example, the growth may be improved by modifying the root architecture of the plant. The growth also may be improved by altering (e.g., improving) lateral root formation or lateral root branching in the plant. The lateral roots of a plant, which constitute the majority of a mature plant's root system, are vital for plant anchorage, absorption of water and nutrients, and survival in the presence of diverse environmental stresses such as drought. In certain embodiments, the growth of the plant is improved by at least about 10% compared to the plant not contacted with the composition of the disclosure. For example, in certain embodiments of the methods as otherwise described herein, the growth of the plant is improved by at least about 12%, or by at least about 15%, by at least about 17%, or by at least about 20%, or by at least about 25%, or by at least about 30%, or by at least about 40%, or by at least about 50%, or by at least about 75%, or even by at least 100% or more as compared to the plant not contacted with the composition.

In one embodiment, the plants may be regulated to reduce growth of the plant. This method may be particularly useful in controlling unwanted plants, such as weeds, that grow among plant crops (i.e., act as herbicides). For example, the growth may be reduced by modifying the root architecture of the plant. In certain embodiments, the growth of the plant is reduced by at least about 20% compared to the plant not contacted with the composition of the disclosure. For example, in certain embodiments of the methods as otherwise described herein, the growth of the plant is reduced by at least about 25%, or by at least about 30%, or by at least about 40%, or by at least about 50%, or by at least about 75%, or even by at least 100% or more as compared to the plant not contacted with the composition.

One aspect of the disclosure provides methods for improving drought tolerance in a plant, the method comprising exogenously contacting a composition comprising an effective amount of one or more apocarotenoids to the plant, a plant part, or a plant seed. The improvement of drought tolerance is essential for stable and adequate crop production in drought-prone areas. Recent studies have determined that alteration of root system architecture affects (e.g., improves) drought tolerance (Uga et al., *Nature Genetics*, 2013, 45:1097-1102; Comas et al., *Front. Plant Sci.*, 2013, 4:442; Rogers and Benfey, *Curr Opin Biotechnol.*, 2015, 32:93-8; Manschadi et al., *Functional Plant Biology*, 2006, 33:823-837). The composition comprising an effective amount of one or more apocarotenoids, such as retinal, improves plant's root systems by, for example, making them deeper and more highly branched, which enhances drought tolerance.

One aspect of the disclosure provides methods for fertilizing plant soil, the method comprising providing a composition comprising an effective amount of one or more apocarotenoids to the soil.

In such embodiments, the composition is applied to the plant, a plant part, a plant seed, and/or an area in a low concentration (e.g., in the nM to µM concentration ranges).

Interestingly, high doses of apocarotenoids can act as herbicides. Hence, yet another aspect of the present disclosure provides a method for controlling a harmful or unwanted plant in a crop comprising, consisting of, or consisting essentially of applying a herbicidally active amount of a composition as described herein to the harmful plant, a part of the harmful plant, a seed of the harmful plant, and/or an area in which the harmful plant grows (e.g., a cultivation area for a crop). Examples of a harmful or unwanted plant include, but are not limited to, a weed, an invasive species of plant (e.g., English Ivy, Kudzu), or a poisonous plant (e.g., poison oak, poison ivy).

According to the indication and active composition used, the application rates required of the compositions described herein can vary within wide limits.

In the methods of the disclosure, the composition disclosed herein is contacted with the plant. Any part of the plant can be contacted with the compositions of the disclosure, including tubers, roots, stems, leaves, flowers, and fruits. The composition can be applied directly to seeds or plants, or can be placed in soil in the vicinity of a seed or plant prior to or at the time of planting. In one embodiment, the composition is sprayed on seeds, tubers, or foliage. Seedlings, as well as more mature plants, can be treated. Flowers and fruits can also be treated by spraying. Roots of transplants can be sprayed or dipped in the composition prior to planting. In certain embodiments, the composition of the disclosure may applied, for example, by contacting the unwanted plants (for example harmful plants such as mono- or dicotyledonous weeds or unwanted crop plants), the seed (for example grains, seeds or vegetative propagation organs such as tubers or budded parts of shoots), or the area on which the plants grow (for example the area under cultivation). In such embodiments, the composition can be applied to the plant, a plant part, a plant seed, and/or an area in a high concentration such that the growth of harmful or unwanted plants are controlled, reduced, prevented, or eliminated.

The composition of the disclosure, and any additional compounds, can be deployed together (for example as a ready-made formulation or by the tank-mix method) or successively in any sequence, for example by application by irrigating, spraying, watering and sprinkling, or by granule scattering, or by soil injection. The amounts of the composition (and any additional compounds) which are optimal in each case depend on the nature of the composition used and any additional compounds used and on the nature and development stage of the plant stock to be treated, and can be determined in each individual case by simple, routine preliminary tests.

According to their properties, the compositions of the disclosure can be used for pretreatment of the seed of the crop plant (for example for dressing of the seed), or introduced into the seed furrows prior to sowing, or employed alone or together with an additional compound(s) prior to or after emergence of the plants. Pre-emergence treatment includes both the treatment of the area under cultivation (including any water present in the area under cultivation, for example in the case of applications to rice) prior to sowing and the treatment of the area under cultivation in which seeds have been sown but which is not yet covered by growing plants.

In other embodiments, the composition of the disclosure can be applied directly to the plant. In other embodiments, the compositions of the disclosure and any additional compounds are applied directly to the roots of the plant. In yet other embodiments, the compositions of the disclosure and any additional compounds are applied directly to soil around the plant (for example, by soil injection). In yet other embodiments, the compositions of the disclosure and any additional compounds are dissolved in water and applied directly to the plant and/or soil of the plant.

In certain embodiments, contacting the composition to the plant is accomplished, for example, by irrigation, watering, sprinkling, spraying, or broadcasting.

For application, the formulations in commercial form are, if appropriate, diluted in a customary manner, for example in the case of wettable powders, emulsifiable concentrates, dispersions and water-dispersible granules with water. Dust-type formulations, granules for soil application or granules for broadcasting, and sprayable solutions are not normally diluted further with other inert substances prior to application.

The composition of the disclosure can be applied to monocot or dicot plants, and to legumes and non-legumes. In one embodiment, the composition is applied to field-grown plants. In another embodiment, the composition is applied to greenhouse-grown plants. In one embodiment, for example, the composition can be applied to tomatoes, rice, corn, cotton, canola, wheat, barley, sugar beet, turf grass, soybeans, peas, chickpeas, dry beans, peanuts, clover, or alfalfa.

Yet another aspect of the present disclosure provides a method for identifying a plant protein associated with a root development phenotype, the method comprising identifying a plant protein that has greater than about 40% to about 90% homology to a vertebrate retinoid binding protein, and determining whether one or more mutations in a gene encoding the plant protein results in a root development phenotype as compared to a wild type plant.

In some embodiments, the plant protein has about 40%, 41%, 42%, 43%, 44% 45%, 46%, 47%, 48%, 49% 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95% homology or greater to the vertebrate retinoid binding protein. In certain embodiments, the plant protein has greater than about 70%, 75%, 80%, 85%, or 90% homology to the vertebrate retinoid binding protein.

The term "significant homology" as used herein can be an Expect (E) value of less than about 5. Protein sequences having significant homology can range from about 40% to about 90% or more homology. Homology between two proteins can be determined using methods known in the art (e.g., Basic Local Alignment Search Tool (BLAST)).

The term "root development phenotype" refers to the observable properties of root growth of the plant. A root development phenotype can be associated with one genotype or multiple genotypes in the plant. A genotype associated with a root development phenotype can include mutations in putative plant RBP-encoding genes. A root development phenotype can also be the result of increased or decreased expression of a protein in part of a plant (e.g., the meristem). A mutant genotype can be identified as associated with a root development phenotype by comparing the root growth of a plant containing the mutant genotype to the root growth a plant not containing the genotype (e.g., a wild-type plant). In some embodiments, the mutant genotype is a non-naturally occurring mutant genotype.

A root development phenotype can also be associated with environmental factors.

A root development phenotype can exhibit reduced or enhanced root development. Examples of a root development phenotype include, but are not limited to, reduced lateral root branching, reduced lateral root formation, reduced cell elongation, short root meristems, increased lateral root branching, increased lateral root formation, increased cell elongation, and long root meristems.

In some embodiments, the plant protein associated with a root development phenotype can have one or more mutations (e.g., 1, 2, 3, 4, 5 or more).

Certain aspects of the disclosure are now explained further via the following non-limiting examples.

EXAMPLES

Materials and Methods

Plant Growth and Treatment Conditions:

*Arabidopsis thaliana*: All seeds were in the Columbia-0 background. Seeds were sterilized with chlorine gas, incubated in 4° C. water for 2 days, and plated on 1% (wt/vol) Murashige and Skoog (1% MS) media with 1% agar. They were exposed to 100-130 μmol/($m^2s^1$) illumination and grown vertically under long-day conditions at 22° C. Plants were analyzed at 7 days after stratification (das), unless noted otherwise. D15-treated media was made using D15 (N-(4-fluorobenzyl)-methoxycinnamic hydroxamic acid) synthesized by LeadGen Labs, LLC solubilized in DMSO. 100 mM D15 stock solution was diluted directly into 1% MS media for final concentrations ranging from 1 μM to 100 μM.

Root Phenotyping:

To measure lateral root capacity, the primary root apical meristem of each seedling was sterilely excised at 7 days. The plants were given 3 days to grow out lateral roots, and then each emerged lateral root was counted using a dissection microscope, as described previously (Van Norman et al., *Proceedings of the National Academy of Sciences of the United States of America*, 2014, 111(13): p. E1300-E1309). Lateral and primary root lengths for *Arabidopsis thaliana* and were measured using ImageJ (National Institutes of Health) software. These methods are described in International Patent Application No. PCT/US2017/033547, which is incorporated herein by reference.

Example 1. Role of the Carotenoid Pathway in Regulating Lateral Root Development Inhibition of apocarotenoid synthesis in *Arabidopsis* leads to defects in de novo root organogenesis, called lateral root organogenesis. Although there are several well-characterized apocarotenoid regulators of certain developmental processes in plant roots, none of these molecules could rescue post-embryonic root organogenesis upon inhibition of carotenoid metabolism. This suggests that a previously uncharacterized apocarotenoid is essential for post-embryonic root organogenesis in *Arabidopsis*. Because retinoids are crucial regulators of development in vertebrates and are also known to bind to photosensitive proteins across different domains of life, it was hypothesized that retinoids could function in root development.

One advantage of studying developmental biology using the root as a model system is that spatial regions of the root have distinct developmental features (FIG. 1A). The meristem, which is comprised of actively dividing pluripotent cells, is located at the tip of the root. As meristematic cells are displaced from the root tip, they lose their mitotic activity and begin lengthening in a region called the elongation zone. Once cells reach their full length, they acquire their final mature features in the differentiation zone. This generates a developmental gradient from pluripotency to differentiation that can be imaged along the length of the root. By characterizing changes in this developmental gradient utilizing chemical reporters for retinal binding protein (RBP) activity, targeted chemical genetics, and molecular biology, several endogenous retinal-related compounds that promote root development were identified. Importantly, evidence of RBP activity was identified in multiple species of plants.

Example 2. An RBP Reporter Reveals Dynamic Retinoid Binding Activity in Roots

Figure 1B:
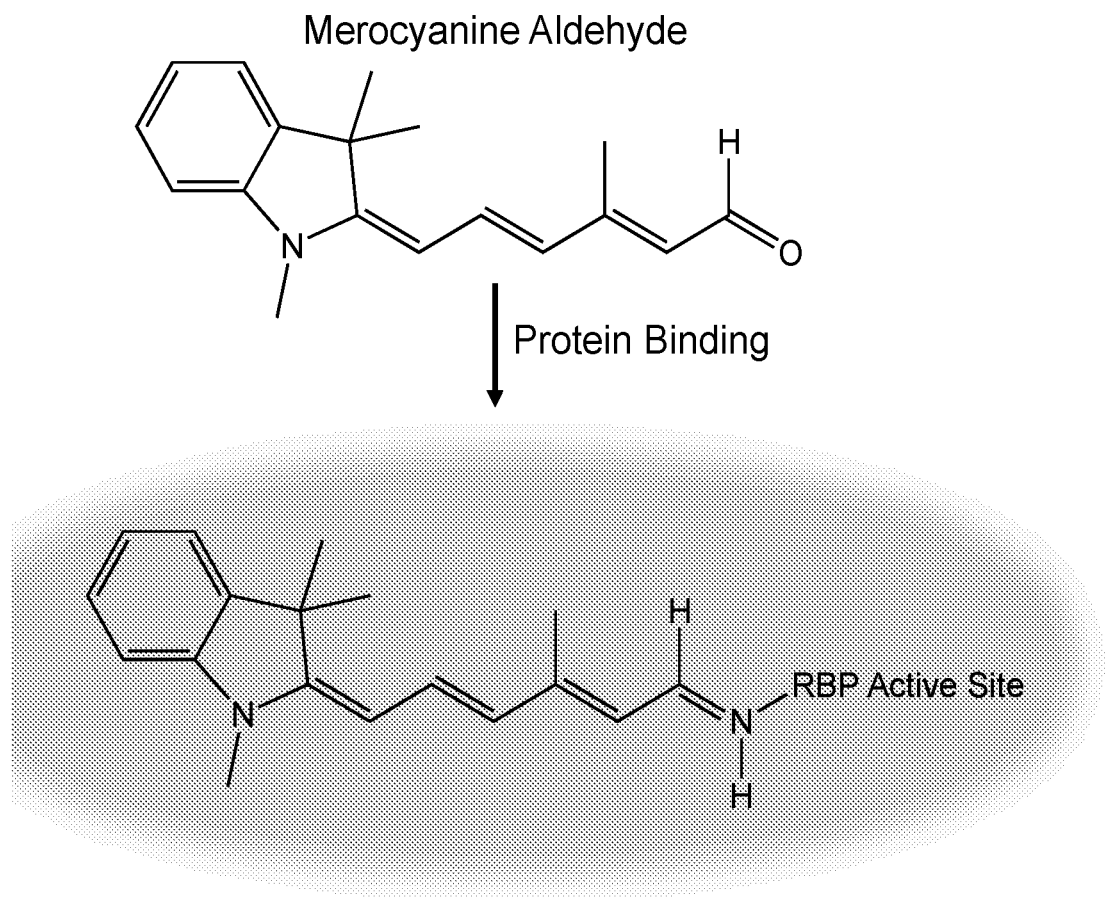
Figure 1C:
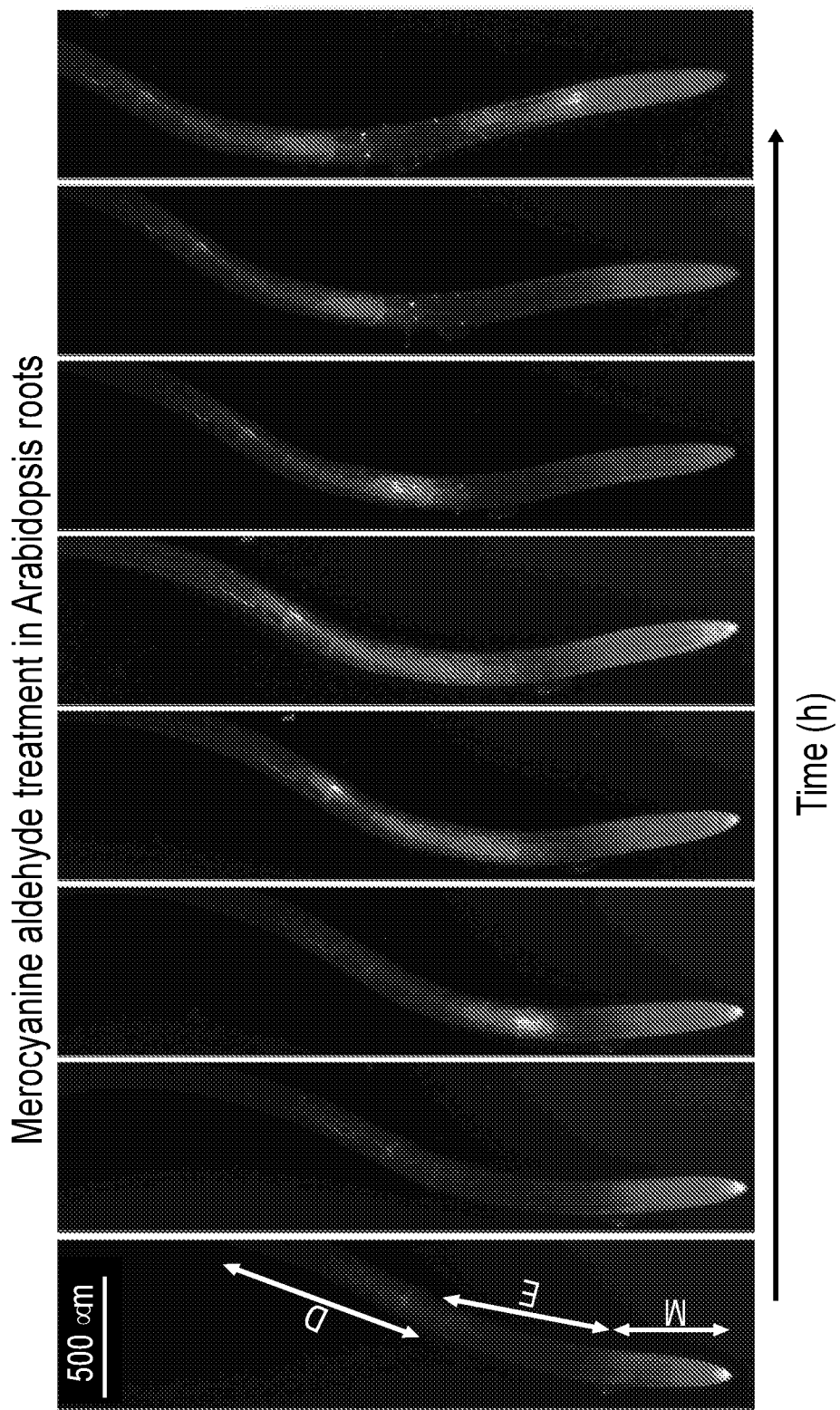

To test whether plant roots have endogenous proteins capable of binding retinoids, *Arabidopsis* roots were treated with merocyanine aldehyde (Yapici et al., *JACS*, 2014, 137(3):1073-1080), a synthetic compound designed to fluoresce when covalently bound to retinal binding proteins (FIG. 1B). In *Arabidopsis* roots, merocyanine aldehyde fluoresces in a dynamic manner in distinct developmental regions in the root (FIG. 1C). Merocyanine aldehyde has fairly constant fluorescence intensity in the root meristem and has intense temporal pulses of fluorescence in the elongation and differentiation zones. These spatial and temporal fluorescence patterns suggest that proteins in the root have the ability to bind to retinal endogenously.

Figure 1D:
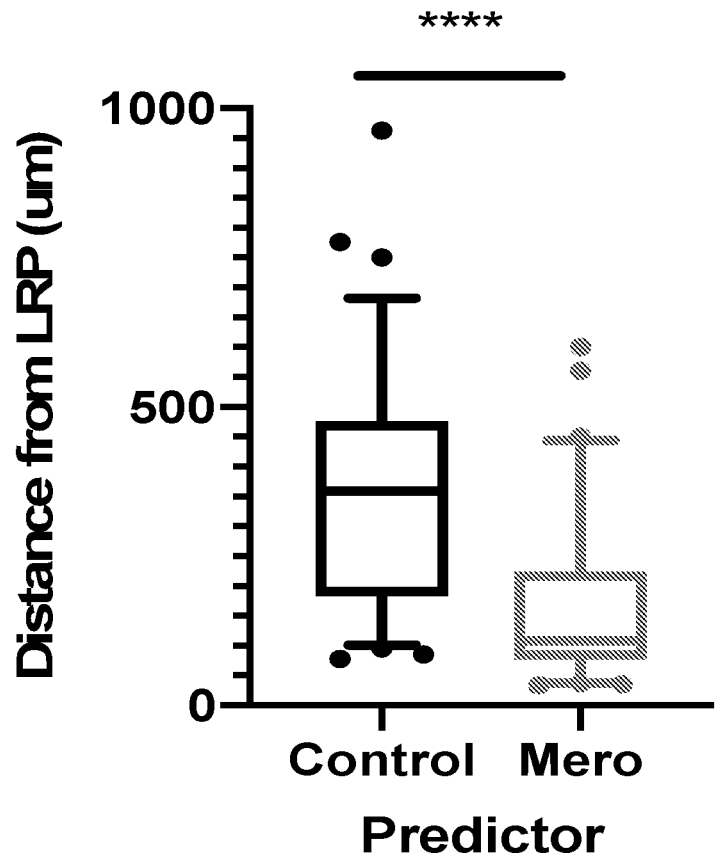
Figure 1E:
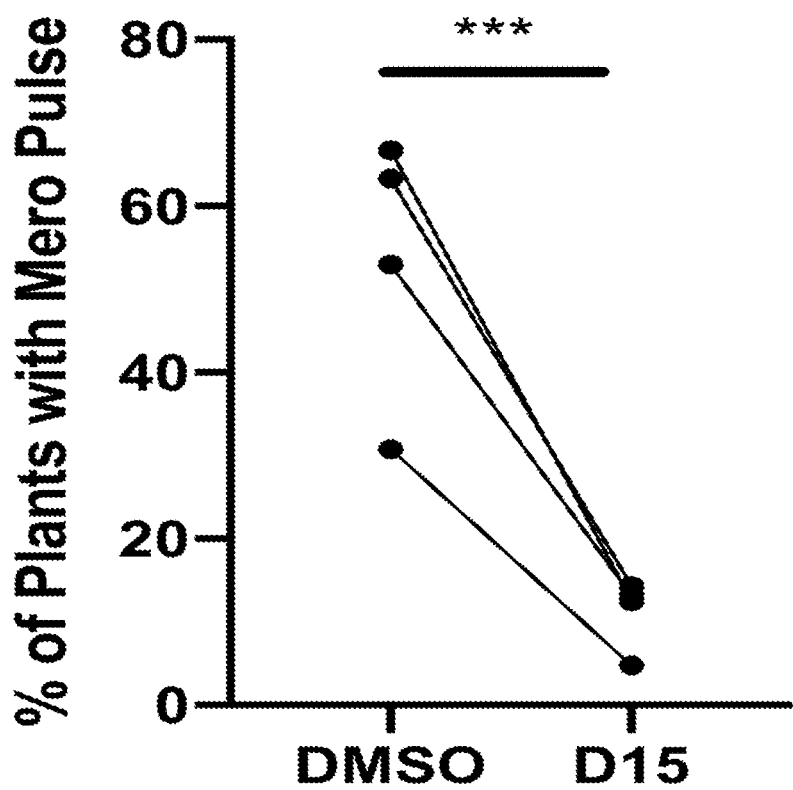

To further characterize the regions in which temporal pulses occur, the cells that experience the maximum fluorescence intensity during these pulses were tracked. It was found that these cells are predictors of the sites of lateral root organogenesis (FIG. 1D). Furthermore, treatment with D15, a chemical inhibitor of lateral root organogenesis (Van Norman et al., *Proceedings of the National Academy of Sciences of the United States of America*, 2014, 111(13): p. E1300-E1309, Dickinson et al., *Proceedings of the National Academy of Sciences of the United States of America*, 2019, 116(21):10563-10567), significantly reduced the number of merocyanine aldehyde pulses (FIG. 1E). In addition, D15 reduced merocyanine aldehyde fluorescence in the root meristem. These results indicate that merocyanine aldehyde binds to proteins in the *Arabidopsis* root that are active during root development, suggesting that retinal may have a role in growth and organogenesis.

Example 3. Retinoids are Endogenous Compounds in *Arabidopsis*

Figure 2A:
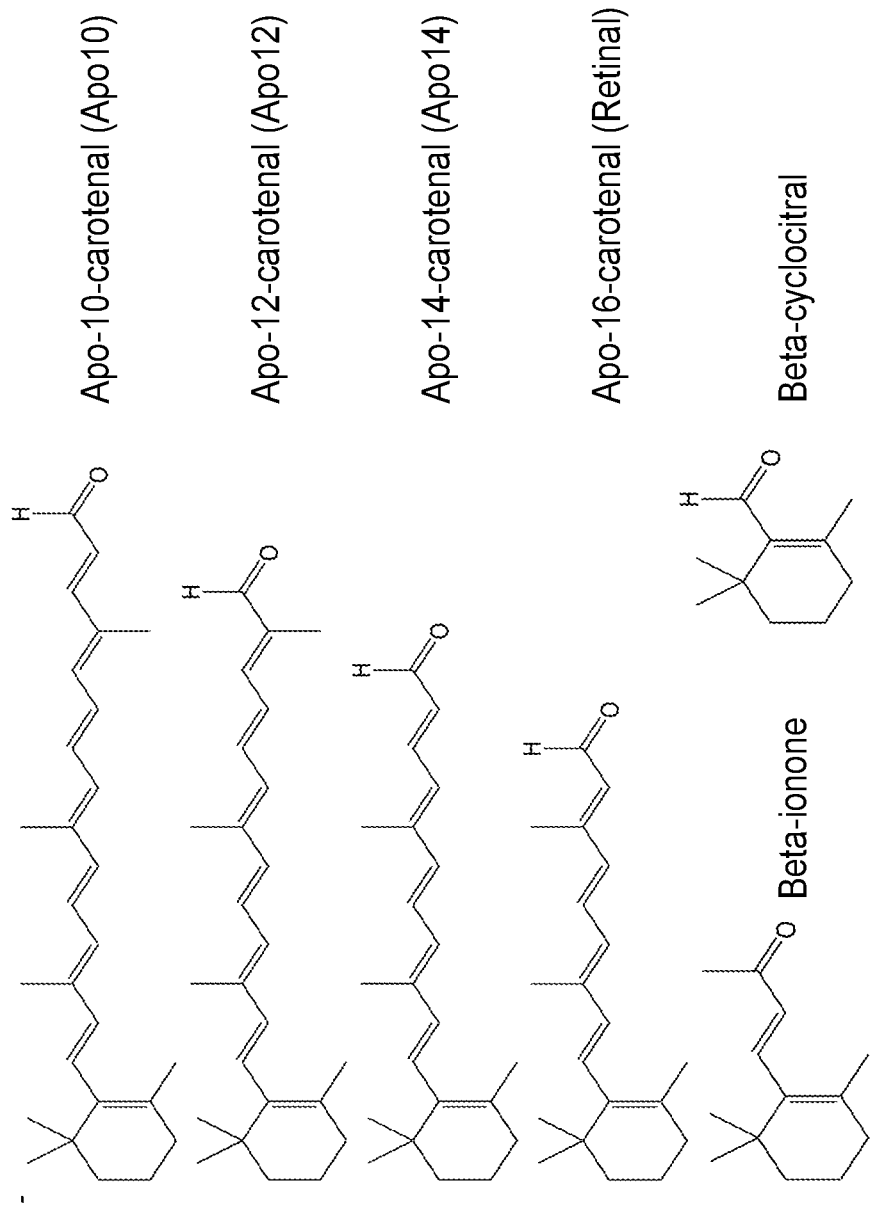
FIG. 2A-2B illustrates that endogenous beta-carotene-derived apocarotenals can be identified in whole plant tissue.
Figure 2B:
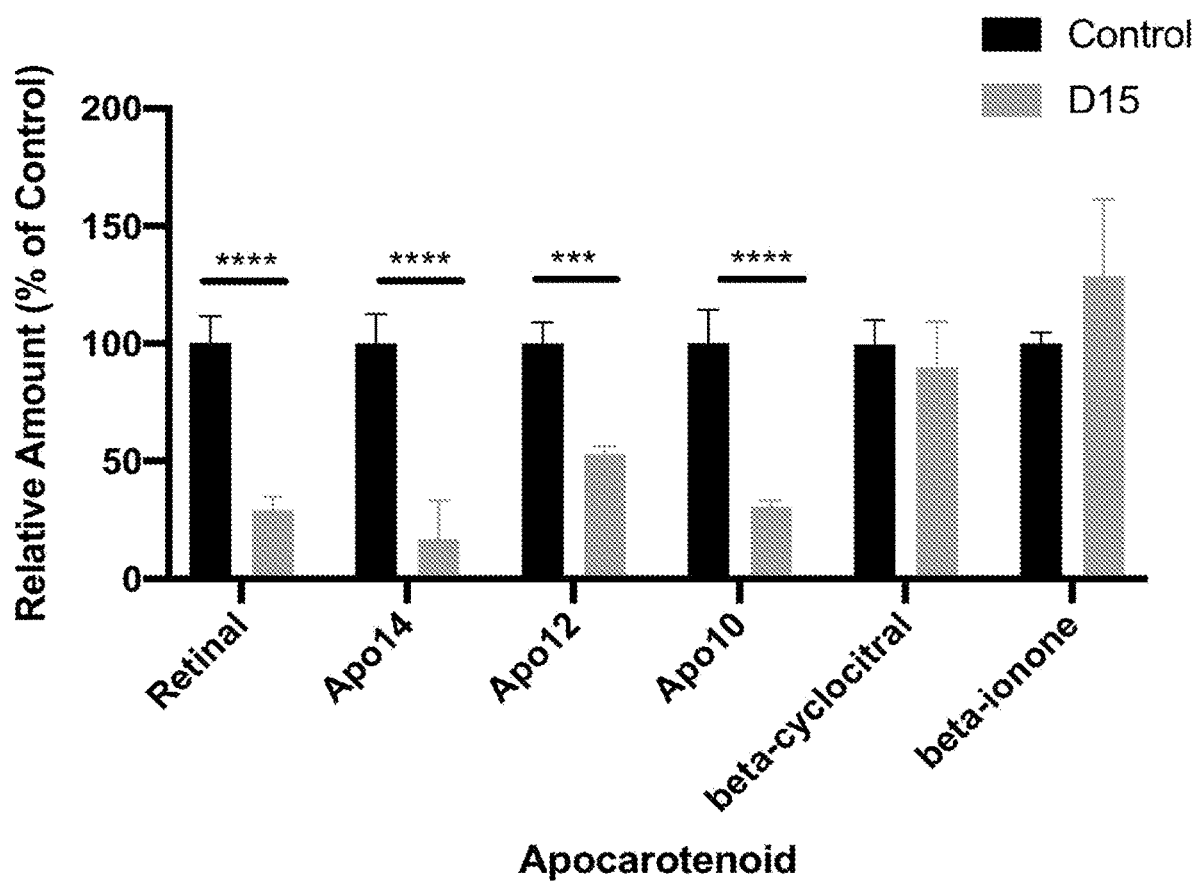

Although retinal has been identified as a chemical component of several plant species (Fleshman, et al., *J Agric Food Chem*, 2011, 59(9):4448-54; Giuffrida, et al., *Food Chem*, 2017, 231:316-323), it has not been found in *Arabidopsis*. To test whether retinal is an endogenous compound in *Arabidopsis*, an extraction, chemical derivatization, and HPLC-MS analysis protocol was developed to detect hydrophobic apocarotenoids in plant tissue. Retinal was identified, as well as three other related apocarotenoids in *Arabidopsis* tissue (FIG. 2A). To test the effect of inhibition of apocarotenoid biosynthesis, plants were treated with D15, an inhibitor of carotenoid cleavage dioxygenase activity previously shown to prevent proper root growth and lateral root organogenesis. In D15 treated plants, levels of retinal as well as the related apocarotenoids were reduced (FIG. 2B). In contrast, D15 did not affect levels of more hydrophilic apocarotenoids such as beta-cyclocitral and beta-ionone. These findings indicate that retinal is endogenously present in *Arabidopsis* and its abundance is reduced by D15 with partial selectivity.

Example 4. Retinoids Rescue Inhibition of Lateral Root Organogenesis

The first known stage of lateral root organogenesis is the oscillation of expression of certain genes, which is called the lateral root clock. D15 has been shown to reduce the amplitude of oscillations in a reporter for the lateral root clock (pDR5:LUC).

Figure 3:
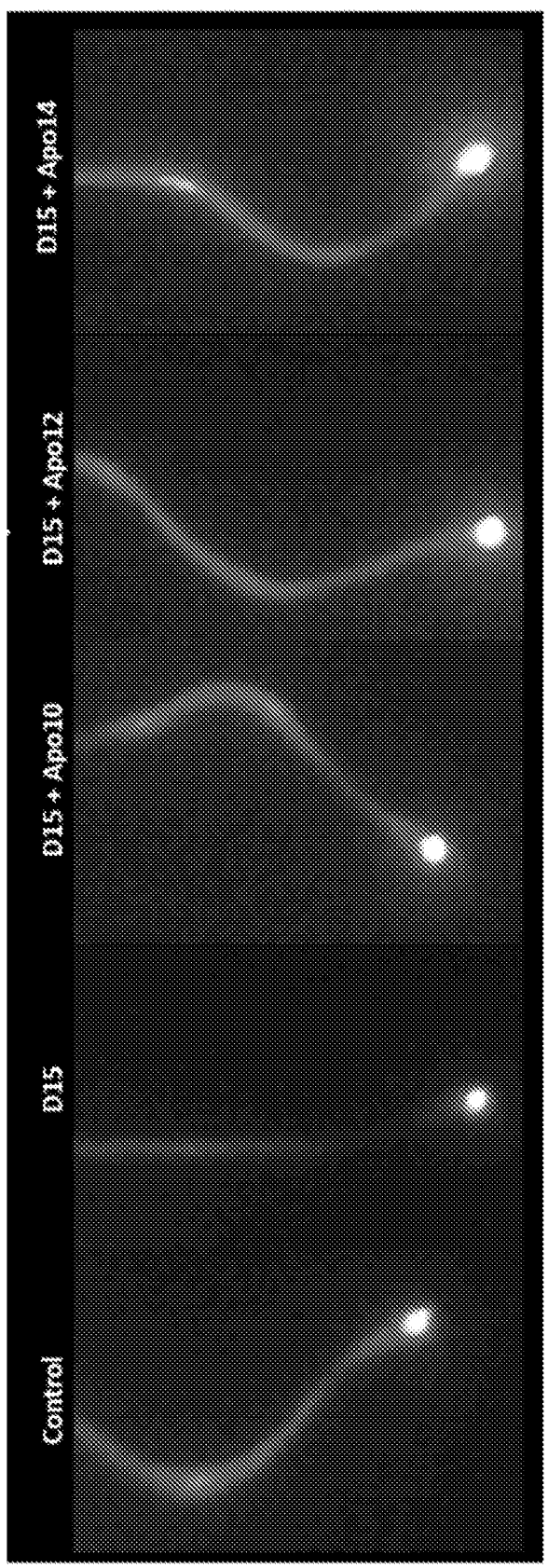
FIG. 3 shows fluorescence images demonstrating that application of apocarotenals increase the oscillation zone maxima in D15-treated plants.

Lateral roots constitute the majority of a mature plant's root system and are vital for plant anchorage, absorption of water and nutrients, and survival in the presence of diverse environmental stresses such as drought tolerance. D15 works by preventing carotenoid cleavage and blocking the formation of apocarotenoids. Inhibition of apocarotenoid formation leads to decreased lateral root initiation. The initiation of lateral roots can be observed using the pDR5: LUC marker line, which oscillates in the region of lateral root initiation. The oscillation maxima determines the new site for a lateral root to initiate. In D15-treated plants, the amplitude of oscillations is significantly decreased (FIG. 3).

Figure 4A:
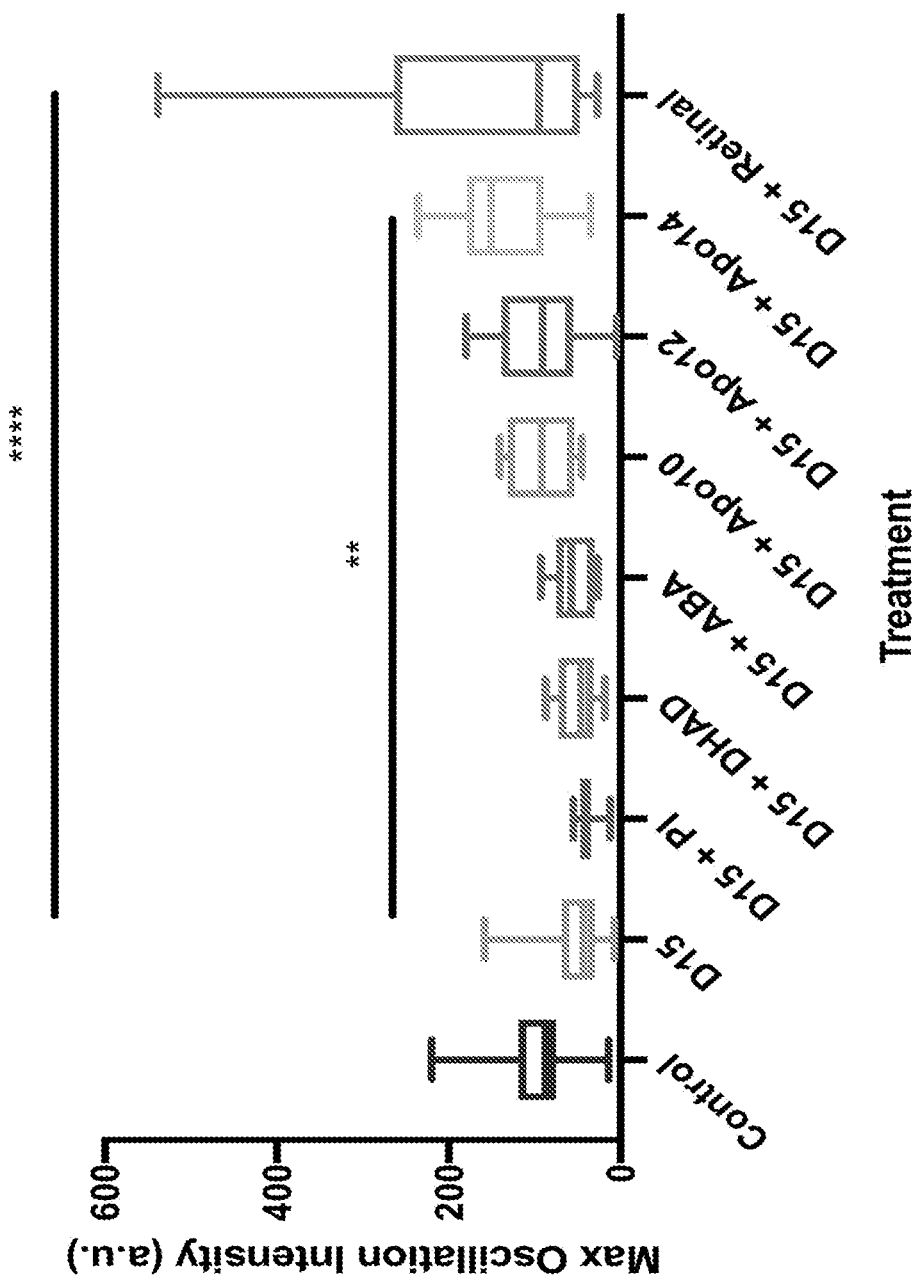
FIG. 4A-4D illustrates the effects of exogenously applied apocarotenoids on root development.

To test whether retinal and other related apocarotenoids can rescue D15 inhibition of the lateral root clock, *Arabidopsis* roots were treated with D15 for several days and then added individual apocarotenoids (FIG. 4A). Apo-14-carotenal (Apo14) and retinal significantly increased the amplitude of the lateral root clock relative to D15 treatment. Apo-10-carotenal and apo-12-carotenal can partially rescue D15 inhibition of lateral root initiation, quantified by measuring the amplitude of oscillations in the pDR5:LUC marker line (FIG. 3 and FIG. 4A).

Figure 4B:
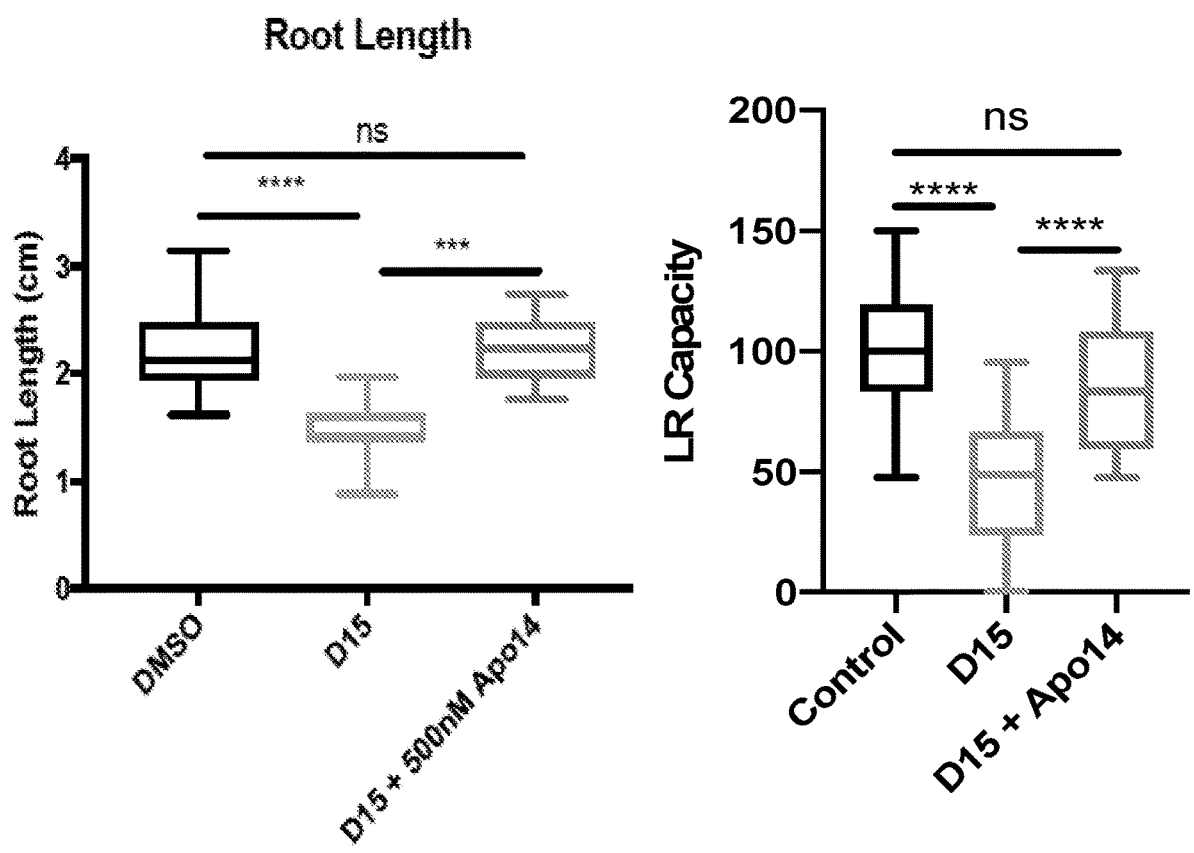
Figure 4C:
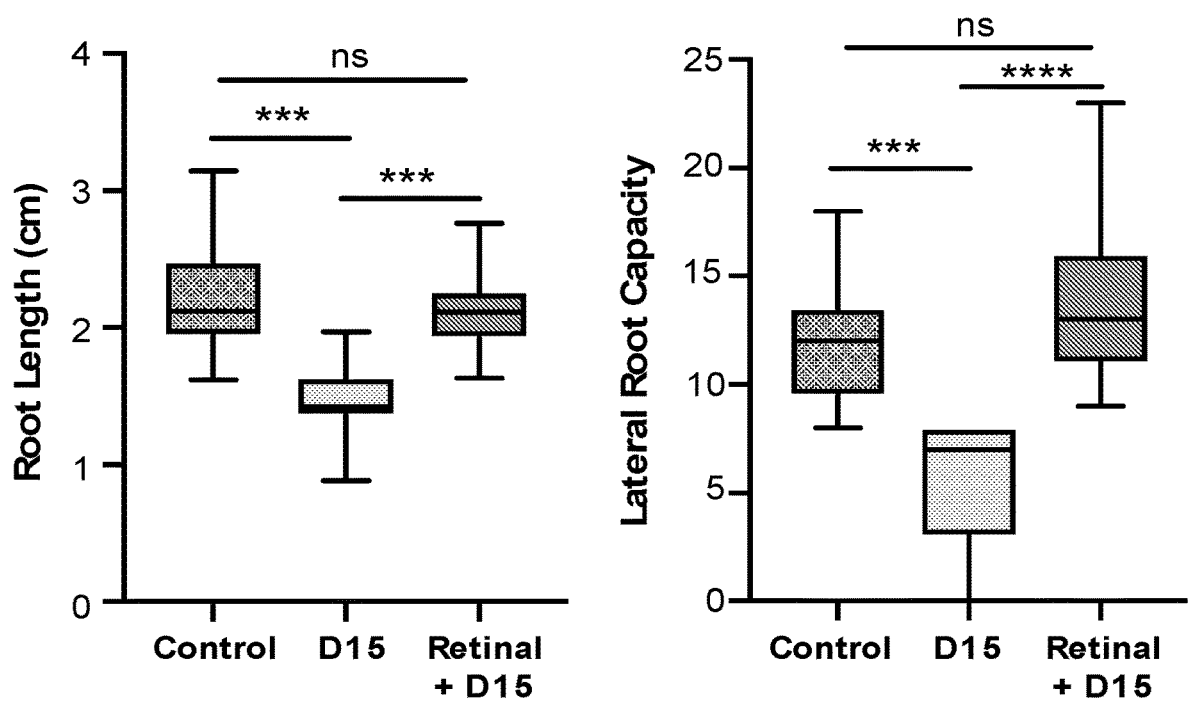
Figure 4D:
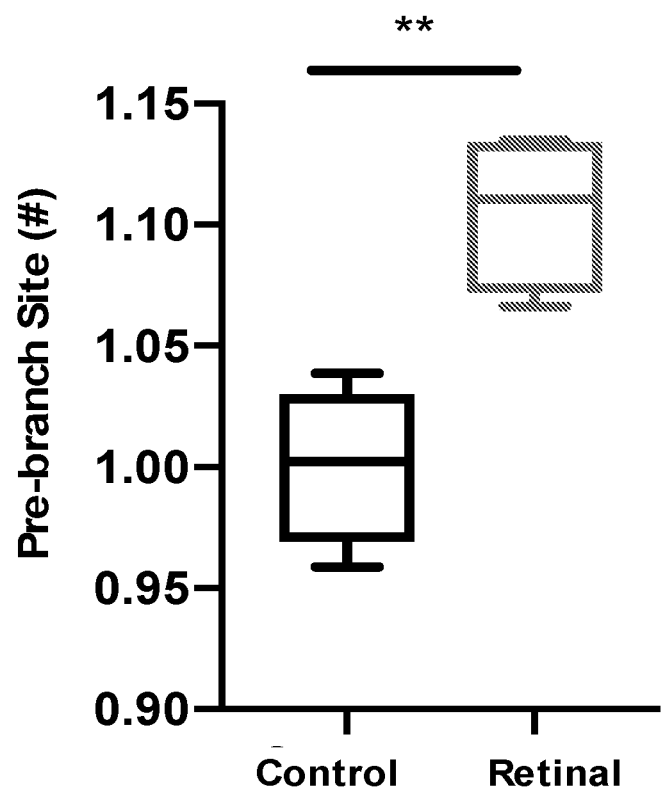

To examine whether these compounds had more long-term effects on root development, *Arabidopsis* was co-treated with D15 and with each of these apocarotenoids. Both retinal and Apo14 were able to fully rescue D15 inhibition of primary root growth and lateral root development (FIG. 4B and FIG. 4C). To characterize the role of retinal stimulation in the absence of D15, plants were treated with retinal alone and quantified root growth and branching. It was found that retinal did not affect primary root length, but did significantly increase the number of lateral root primordia (FIG. 4D). These results indicate that these apocarotenoids can function as endogenous regulators of primary and lateral root development. These results suggest that one or all of these compounds may be new plant hormones. Apo-10-carotenal, apo-12-carotenal, apo-14-carotenal, and apo-16-carotenal (retinal) all show the ability to act as plant growth enhancers, and these apocarotenoids can present new ways to stimulate crop growth and protect crops from environmental stress.

Example 5: Plant RBP Homologues are Important for Proper Lateral Root Organogenesis Taken together, these results suggest that retinal, or related compounds, may bind to plant proteins and regulate post-embryonic root development. To uncover proteins with the potential to bind to retinoids, plant proteins with homology to vertebrate RBPs using the Basic Local Alignment Search Tool (BLAST) were searched. Twenty one proteins were identified in *Arabidopsis* with significant homology to vertebrate RBPs (Table 1).

TABLE 1

Putative RBP homologues in plants.

| Gene | Name | Known Function | Expressed in Root? | Meristem enrichment? | Mutant LR Phenotype? |
|---|---|---|---|---|---|
| AT1G66300 | AXX17 | F-box/RNI-like/FBD-like domains-containing protein | No | Yes | |
| AT3G47860 | chloroplastic lipocalin | Transports hydrophobic molecules | Yes | No | Reduced |
| AT5G58070 | ATTIL | Temperature-induced transporter of hydrophobic molecules | Yes | No | Reduced |
| AT3G17920 | Outer arm dynein light chain 1 | Motor protein | Yes | No | ns |
| AT1G03370 | C2CLB | C2 calcium/lipid-binding and GRAM domain containing protein | Yes | No | Reduced |
| AT1G02620 | | Ras-related small GTP-binding family protein | No | No | |
| AT1G79280 | | Nuclear pore anchoring protein | Yes | Yes | Reduced |
| AT1G16630 | | transmembrane protein (chloroplast) | Yes | Yes | |
| AT3G59820 | LETM1-like protein | calcium binding | Yes | Yes | |
| AT2G17050 | | disease resistance protein transmembrane receptor | Yes | No | |
| AT3G55950 | CRINKLY4 related 3 | Protein kinase | Yes | No | Increased |
| AT1G09420 | Glucose-6-phosphate dehydrogenase like protein | Does not encode a functional G6PDH | Yes | Yes | |
| AT1G74320 | Protein kinase superfamily protein | | Yes | No | |
| AT1G74320 | Target SNARE coiled-coil domain protein | SNAP Receptor, vesicle fusion | No | No | |
| AT4G05090 | Inositol monophosphatase family protein | inositol or phosphatidylinositol phosphatase activity | Yes | Yes | |
| AT1G72150 | PATELLIN1 | Sec14p-like phosphatidylinositol transfer family protein | Yes | Yes | |
| AT1G22530 | PATELLIN2 | Sec14p-like phosphatidylinositol transfer family protein | Yes | Yes | |
| AT1G72160 | PATELLIN3 | Sec14p-like phosphatidylinositol transfer family protein | Yes | Yes | ns |
| AT1G30690 | PATELLIN4 | Sec14p-like phosphatidylinositol transfer family protein | Yes | Yes | |

TABLE 1-continued

Putative RBP homologues in plants.

| Gene | Name | Known Function | Expressed in Root? | Meristem enrichment? | Mutant LR Phenotype? |
|---|---|---|---|---|---|
| AT4G09160 | PATELLIN5 | Sec14p-like phosphatidylinositol transfer family protein | Yes | Yes | |
| AT3G51670 | PATELLIN6 | Sec14p-like phosphatidylinositol transfer family protein | Yes | Yes | |

Figure 5:
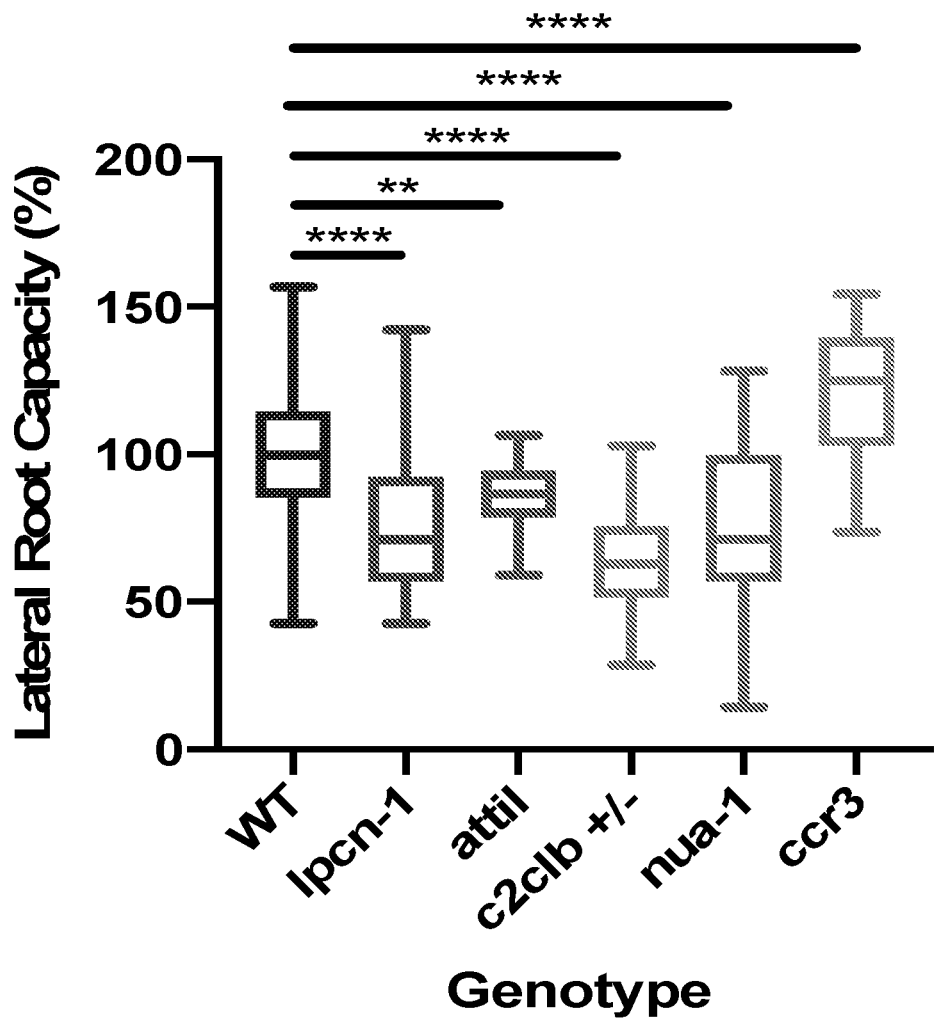
FIG. 5 is a graph showing plants with mutations in putative plant RBP-encoding genes have defects in their capacity to produce lateral roots.

Of these 21 RBP homologues (RBPHs), 11 have been identified as being enriched in the root meristem in previously published tissue-specific RNA-seq experiments (Song, L.; Yamada, M. et al. *Developmental Cell*, 2016 and Brady, S. M.; Orlando, D. A. et al. *Science* 2007) or in microscopy experiments using transgenic reporters (Tejos et al., *J Cell Sci*, 2018, 131(2)). Single mutants for seven of these proteins have been tested for defects in lateral root branching, lateral root organogenesis, and meristem size. In particular, RBPH mutants were characterized for defects in lateral root development. It was found that five of the seven single mutant lines tested have abnormalities in lateral root branching (FIG. 5). Mutations in two lipocalins (AT3G47860 and AT5G58070), proteins that non-specifically bind retinoids as well as lipids in vertebrates, result in significantly reduced lateral root branching in *Arabidopsis*. Mutations in a C2 calcium/lipid binding protein (C2CLB) and a nuclear pore anchoring protein (NUA), which respectively share 75% and 89% homology with the RA binding pocket of a vertebrate protein, also cause reduced lateral root formation. CRINKLY-related 3 (CCR3), a protein that has been previously implicated as a suppressor in lateral root development (De Smet et al., *Science*, 2008, 322(5901):594-7), was found to have 80% homology to RA binding proteins in vertebrates. These measurements confirm that mutations in CCR3 result in increased lateral root formation. Although a root development phenotype was not observed in the single PATELLIN3 mutant, quadruple mutants of PATELLIN proteins have been shown to have abnormally short root meristems (Tejos et al., *J Cell Sci*, 2018, 131(2)). Overall, these results indicate that six of the seven RBPH protein families examined have significant defects in *Arabidopsis* root development. This further suggests that endogenous RA binds to proteins in *Arabidopsis* and that this interaction may be important for root development.

Example 6: RBP Activity can be Observed in Crop Species

Figure 6:
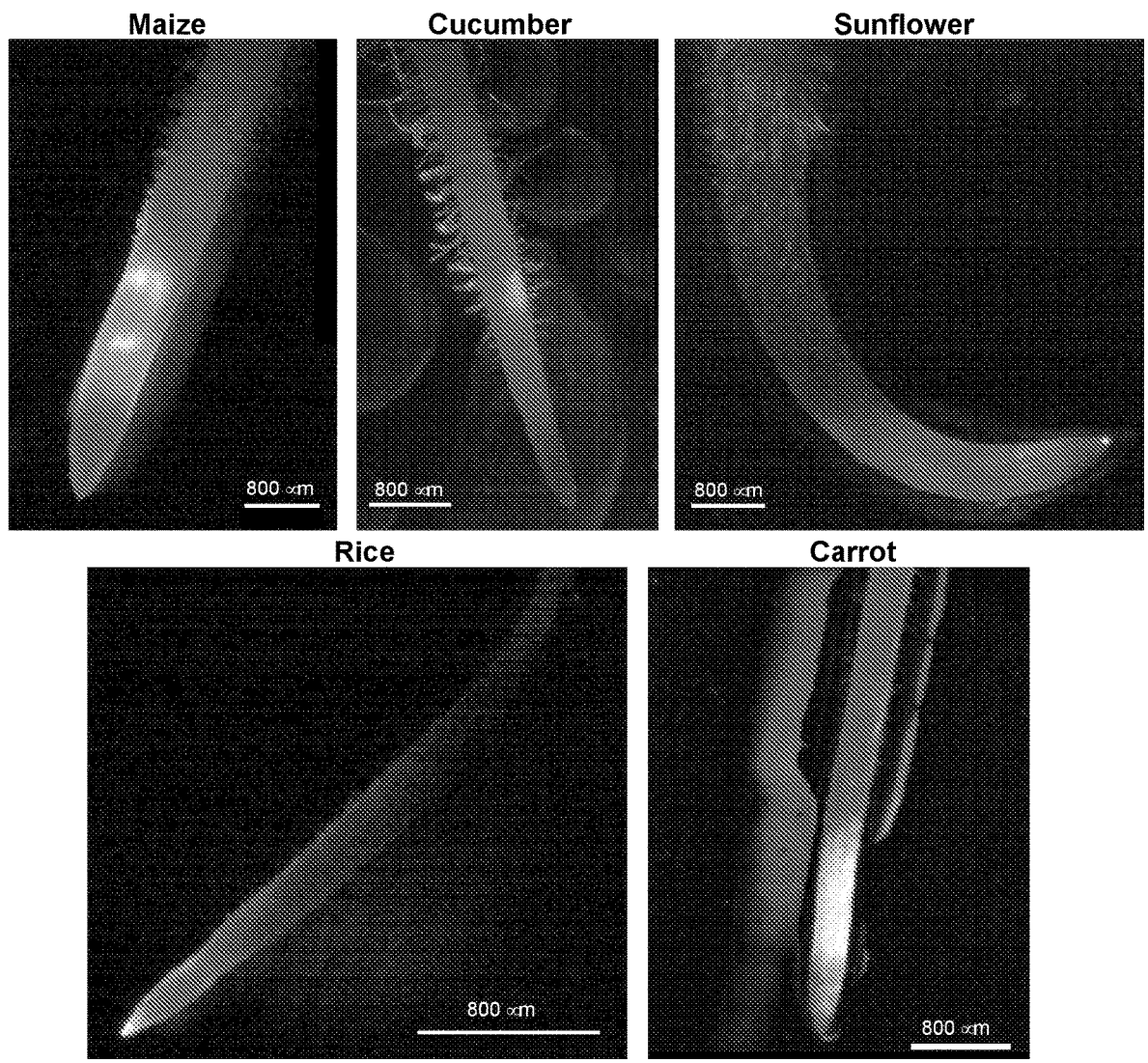
FIG. 6 shows fluorescent images showing merocyanine aldehyde fluorescence in maize, cucumber, sunflower, rice, and carrot roots.

To determine whether retinoids interact with proteins in crops, maize, sunflower, and cucumber roots were treated with the merocyanine aldehyde RBP reporter. High levels of fluorescence were observed in specific developmental regions of crop roots (FIG. 6). For example, in maize roots the reporter produced fluorescent meristems as well as pockets of intense fluorescence in the elongating and differentiating regions of the root. Cucumber roots, in contrast, had much lower fluorescence intensity in the meristem, but had bright pulses of fluorescence closer to the differentiation zone. Sunflower, rice, and carrot roots have fluorescent meristems, but did not have obvious elongation/differentiation zone pulses. These data indicate that there are proteins in developing crop root tissue that are capable of binding RA. Overall, these proteins appear to localize in similar developmental regions of crop roots as in *Arabidopsis* roots, suggesting that retinal may also be important for crop root growth and branching.

Example 7: Retinal May be a Precursor to an Active Retinoid-Related Compound

This work indicates that retinoids play an important role in plant development. In vertebrates, retinoic acid is the predominant developmentally active retinoid compound, although RA and retinol also have physiological functions. In addition, mammalian RBPs have been shown to bind to retinal-related compounds, including Apo14, although there is no known function of Apo14 in mammals (Eroglu et al., *JBC*, 2012, 287(19):15886-95). Which apocarotenoid compounds are the primary active signaling molecules in plant root development remains unknown. The fluorescence intensity profile of merocyanine aldehyde indicates that proteins in plants can bind retinal, since oxidized and reduced merocyanine aldehyde (which respectively report retinoic acid and retinol binding) have different fluorescence excitation and emission maxima. However, either of these molecules may still be active in plant roots. In addition, the other hydrophobic retinal-related apocarotenoids, such as Apo14, could be the predominant active compound in plants. One feature of the retinal-related compounds tested for their ability to affect root development is that they can all be metabolized to retinal. This suggests that retinal is the most probable precursor to the active metabolite, or the active metabolite itself.

Using a reporter developed for mammalian retinal binding proteins, evidence of retinal binding in the meristem, elongation, and differentiation zones in *Arabidopsis*, sunflower, maize, and cucumber roots was observed. Further characterization of this reporter in *Arabidopsis* indicated that RBP activity in elongating and differentiating root cells plays a role in lateral root organogenesis. This suggests that retinal regulates root development. To further support this hypothesis, retinal endogenously, along with several related apocarotenoid compounds, were identified. Partially specific inhibition of retinal and related compounds by D15 results in defects in root growth and lateral root organogenesis. Addition of retinal or Apo14 fully rescued these defects. These results indicate that retinal or Apo14 is either the precursor or active signaling molecule essential for root growth and branching. The presence of plant proteins with homology to vertebrate RBPs further suggests that retinoids are capable of interacting with plant proteins. Furthermore, characterization of these plant RBP homologues revealed that retinoids and their binding partners are essential regulators of root development. The ability of these apocarotenoids to alter root development through exogenous application supports their potential use to enhance root branching and growth in crop plants It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

What is claimed is:

1. A method for regulating growth in a plant, the method comprising:
    exogenously contacting a composition comprising an effective amount of apo-10-carotenal with a plant, a plant part, or a plant seed.
2. The method of claim 1, wherein regulating comprises improving growth of the plant.
3. The method of claim 2, wherein the improving growth comprises modifying the root architecture of the plant.
4. The method of claim 2, wherein the improving growth alters lateral root formation in the plant.
5. The method of claim 2, wherein the growth of the plant is improved by at least about 10% compared to a plant not contacted with the composition.
6. The method of claim 1, wherein regulating comprises reducing the growth of the plant.
7. A method for controlling a harmful or unwanted plant in a crop, the method comprising:
    exogenously contacting a composition comprising a herbicidally active amount of apo-10-carotenal with a harmful or unwanted plant, a harmful or unwanted plant part, a harmful or unwanted plant seed, and/or an area in which the harmful or unwanted plant grows, wherein the harmful or unwanted plant is a weed, an invasive species, or a poisonous plant.
8. The method of claim 7, wherein the composition further comprises one or more fertilizers, micronutrients, insecticides, fungicides, nematocides, bactericides, acaricides, herbicides, plant nutrients, rooting stimulants, chemosterilants, semiochemicals, repellents, attractants, pheromones, feeding stimulants, microbial inocula, entomopathogenic bacteria, entomopathogenic viruses, or entomopathogenic fungi.
9. The method of claim 7, wherein the effective amount of the apo-10-carotenal is in a concentration of about 0.01 μM to about 100 mM in the composition.
10. The method of claim 7, wherein the weed comprises a monocotyledonous or dicotyledonous weed, wherein the invasive species comprises English Ivy or Kudzu, or wherein the poisonous plant comprises poison oak or poison ivy.
11. The method of claim 8, wherein the fertilizers comprise calcium, nitrogen, potassium, phosphorous, or any combination thereof.
12. The method of claim 8, wherein the micronutrients comprise metal ions.

* * * * *